US012634364B1

(12) United States Patent
Morris

(10) Patent No.: US 12,634,364 B1
(45) Date of Patent: May 19, 2026

(54) AUTONOMOUS REAL-TIME EVENT TRIGGERED DATA EXCHANGE SYSTEM

(71) Applicant: William Owen Morris, League City, TX (US)

(72) Inventor: William Owen Morris, League City, TX (US)

( * ) Notice: Subject to any disclaimer, the term of this patent is extended or adjusted under 35 U.S.C. 154(b) by 0 days.

(21) Appl. No.: 19/085,291

(22) Filed: Mar. 20, 2025

Related U.S. Application Data

(60) Provisional application No. 63/739,208, filed on Dec. 27, 2024.

(51) Int. Cl.
H04L 67/1074 (2022.01)
G06Q 30/018 (2023.01)

(52) U.S. Cl.
CPC ....... H04L 67/1074 (2013.01); G06Q 30/018 (2013.01)

(58) Field of Classification Search
CPC ........................ H04L 67/10015; H04L 67/563
USPC .......................................................... 709/203
See application file for complete search history.

(56) References Cited

U.S. PATENT DOCUMENTS

| | | | | |
|---|---|---|---|---|
| 11,971,881 | B1 * | 4/2024 | Surendran | ........... G06F 16/2379 |
| 2012/0290422 | A1 | 11/2012 | Bhinder | |
| 2014/0006198 | A1 | 1/2014 | Daly et al. | |
| 2020/0160306 | A1 | 5/2020 | Gollan | |
| 2020/0320503 | A1 * | 10/2020 | Mell | .................... G06Q 20/204 |
| 2022/0327636 | A1 | 10/2022 | Rhoss | |
| 2023/0162270 | A1 | 5/2023 | Elder et al. | |
| 2024/0378604 | A1 * | 11/2024 | Wanage | ............... G06Q 20/401 |

FOREIGN PATENT DOCUMENTS

| | | |
|---|---|---|
| AU | 2013100314 A4 | 4/2013 |
| AU | 2012238211 A1 | 1/2014 |
| DE | 102021004483 A1 | 3/2023 |
| WO | 2014089639 A1 | 6/2014 |
| WO | 2016157137 A1 | 10/2016 |

OTHER PUBLICATIONS

Concur, Spend management—done in a snap, accessed Jan. 15, 2025, www.concur.com/.
Fyle, Expense Management That SMBs Deserve, accessed Jan. 15, 2025, www.fylehq.com/.

* cited by examiner

*Primary Examiner* — A. Hunter Wilder
*Assistant Examiner* — Joseph M Mutschler
(74) *Attorney, Agent, or Firm* — Thompson Patent Law Offices PC

(57) ABSTRACT

Apparatus and associated methods relate to automatic data exchange records generation engine (ADERGE). As an illustrative example, the ADERGE may detect an initiation of a data exchange process in real-time between a first device and a second device. For example, the ADERGE may determine exchange details of the data exchange process. For example, the ADERGE may apply a compliance data model based on a predetermined set of features identified from the exchange details to generate a dual compliant data object comprises the integrated receipt of the data exchange process. For example, the dual compliant data object may include an association between the data exchange process and a characterization and at least one of predetermined external processes. Various embodiments may advantageously generate the autonomously generated dual compliant data input of the data exchange process.

20 Claims, 12 Drawing Sheets

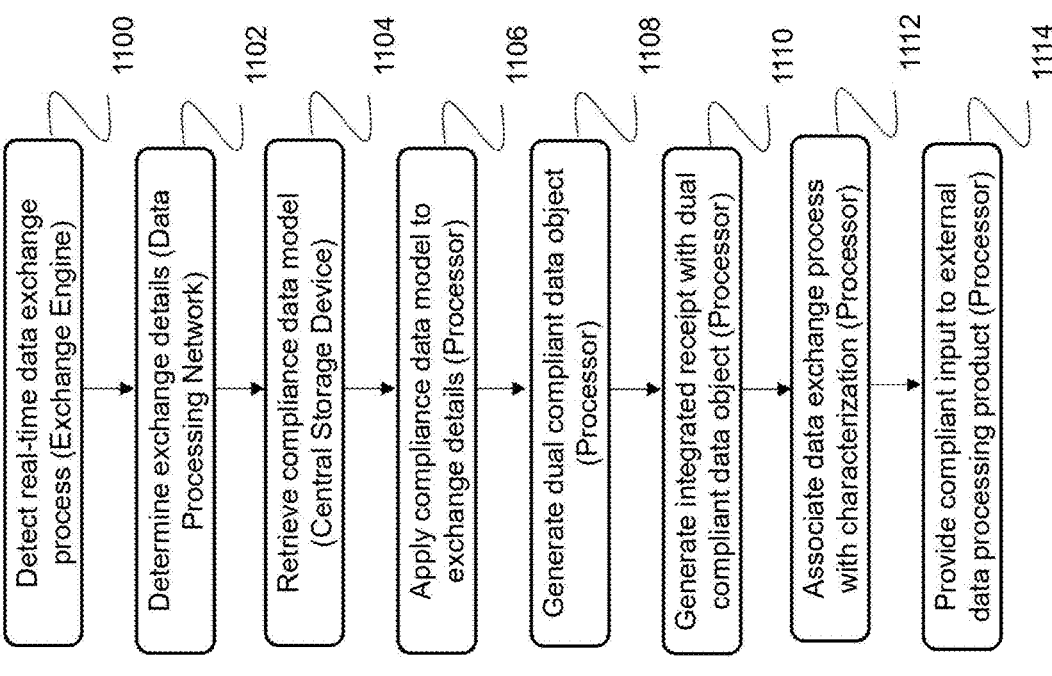

FIG. 11

Detect real-time data exchange process (Exchange Engine) — 1100

Determine exchange details (Data Processing Network) — 1102

Retrieve compliance data model (Central Storage Device) — 1104

Apply compliance data model to exchange details (Processor) — 1106

Generate dual compliant data object (Processor) — 1108

Generate integrated receipt with dual compliant data object (Processor) — 1110

Associate data exchange process with characterization (Processor) — 1112

Provide compliant input to external data processing product (Processor) — 1114

AUTONOMOUS REAL-TIME EVENT TRIGGERED DATA EXCHANGE SYSTEM

CROSS-REFERENCE TO RELATED APPLICATIONS

This application claims the benefit of U.S. Provisional Application Ser. No. 63/739,208, titled "System and Method for Real-Time Itemized Receipt Delivery and Automated Accounting Integration via Middleware," filed by William Owen Morris on Dec. 27, 2024.

This application incorporates the entire contents of the foregoing application(s) herein by reference.

TECHNICAL FIELD

Various embodiments relate generally to data processing and generation within data exchange systems.

BACKGROUND

Business travel is an essential part of corporate operations, allowing employees to attend meetings, conferences, and client engagements worldwide. However, these trips inevitably incur various costs, including flights, accommodations, meals, transportation, and incidental expenses. Managing these expenditures efficiently is critical for both employees and employers, as financial mismanagement can lead to budget overruns, reporting errors, and compliance risks.

With the rise of digital payment systems, business travelers now have access to multiple payment methods, such as corporate credit cards, digital wallets, NFC-based transactions, and even cryptocurrency in some cases. These advancements have streamlined the payment process, reducing the need for cash transactions and enabling faster, more secure payments. However, despite these innovations, digital payments alone do not solve the challenges associated with expenditure management that, for example, may take a significant time of the traveling employee.

After a business trip, employees may, for example, need to submit expense reports for reimbursement, a process that often involves collecting paper receipts, manually entering expenses into reporting systems, and justifying each transaction according to company policies. This manual workflow is prone to delays, errors, and inconsistencies, making it difficult for finance teams to reconcile expenses accurately. Moreover, ensuring tax compliance and categorizing expenses correctly for financial reporting adds another layer of complexity.

SUMMARY

Apparatus and associated methods relate to automatic data exchange records generation engine (ADERGE). As an illustrative example, the ADERGE may detect an initiation of a data exchange process in real-time between a first device and a second device. For example, the ADERGE may determine exchange details of the data exchange process. For example, the ADERGE may apply a compliance data model based on a predetermined set of features identified from the exchange details to generate a dual compliant data object comprises the integrated receipt of the data exchange process. For example, the dual compliant data object may include an association between the data exchange process and a characterization and at least one of predetermined external processes. Various embodiments may advantageously generate the autonomously generated dual compliant data input of the data exchange process.

As an illustrative example, a middleware system operates across payment methods to integrate financial information and transactions. In some examples, a POS information exchange engine may receive itemized information of electronic transactions from POS systems in real-time. Various embodiments may advantageously process the itemized information automatically to be IRS compliant, which in turn may streamline tax preparation.

Various embodiments may achieve one or more advantages. For example, some embodiments may eliminate manual receipt tracking and data entry. This may reduce errors in financial record-keeping and ensure compliance with tax regulations. Additionally, it may provide real-time visibility into business expenses. The automated integration across different payment methods and accounting platforms can reduce administrative overhead and improve accuracy in financial reporting.

The details of various embodiments are set forth in the accompanying drawings and the description below. Other features and advantages will be apparent from the description and drawings, and from the claims.

BRIEF DESCRIPTION OF THE DRAWINGS

FIG. 11 illustrates a flowchart for a data exchange process with compliance integration.

Like reference symbols in the various drawings indicate like elements.

DETAILED DESCRIPTION OF ILLUSTRATIVE EMBODIMENTS

Figure 1:
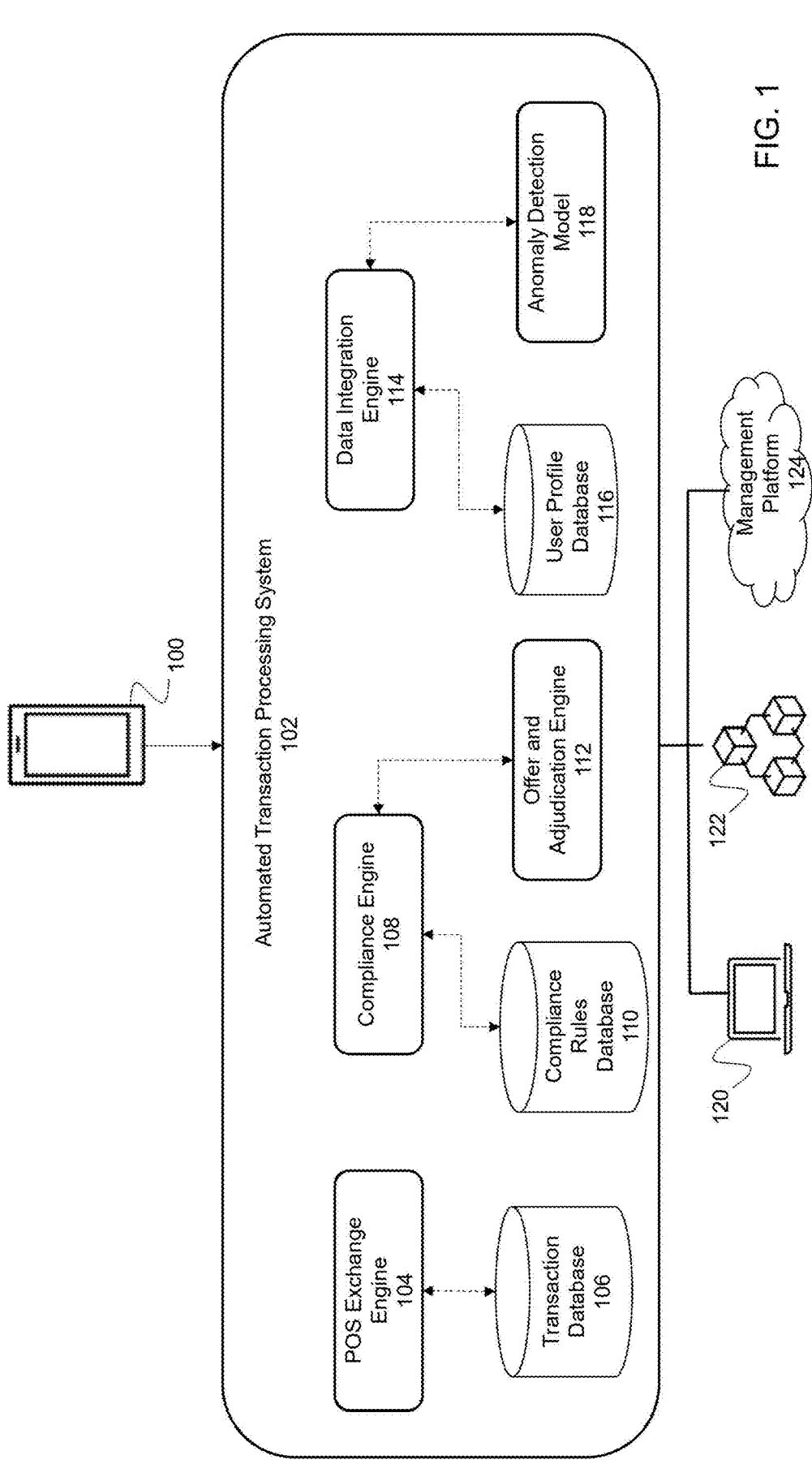
FIG. 1 illustrates a block diagram of an automated transaction processing system employed in an illustrative use-case scenario.

To aid understanding, this document is organized as follows. First, to help introduce discussion of various embodiments, an automated transaction processing system is introduced with reference to FIGS. 1 and 2. Second, that introduction leads into a description with reference to FIGS. 3-7 of some exemplary embodiments of the automated transaction processing system. Third, with reference to FIGS. 8-12, the automated transaction processing system is described in application to exemplary transaction processing and compliance scenarios. Fourth, with reference to FIGS.

3-10 the discussion turns to exemplary embodiments that illustrate how the automated transaction processing system can be developed. Fifth, and with reference to FIGS. 1-11, this document describes exemplary apparatus and methods useful for automated transaction processing and compliance. Sixth, this disclosure turns to a review of experimental data and a discussion of efficiency improvements enabled by the automated transaction processing system. One topology is reviewed with reference to FIGS. 3-5. A second exemplary embodiment of the automated transaction processing system is reviewed with reference to FIGS. 6-12. Seventh, the document introduces details of the automated transaction processing system's data transformation capabilities. Finally, the document discusses further embodiments, exemplary applications and aspects relating to automated transaction processing and processing.

The automated transaction processing system described herein may provide an approach for real-time processing and integration of transaction data across multiple payment methods and platforms. In contrast to traditional methods that rely on manual data entry, this system may enable instantaneous detection and processing of transactions.

In some examples, the system may include a data store and a processor operably coupled to the data store. In some examples, the processor may execute a program of instructions to perform operations that transform raw transaction data into standardized, tax-compliant formats suitable for integration with accounting systems.

In some examples, a feature of the system may include its ability to detect data exchange processes in real-time. This real-time detection may allow for immediate capture and processing of transaction details, which in turn may eliminate delays and reduce errors associated with manual data entry.

In some examples, the system may transform transaction data through multiple stages. Raw transaction data from various sources may be captured and standardized. This standardized data may then be processed using compliance models to generate dual-compliant data objects. These data objects may be structured to be compatible with external accounting systems. Additionally, the data objects may be structured to meet regulatory compliance requirements.

In some examples, by automating the processing of transaction data in real-time, the system may address challenges associated with integrating diverse payment methods and ensuring regulatory compliance. The system's ability to transform raw transaction data into standardized, compliant formats may represent an improvement over manual or batch processing methods.

In some examples, a feature of the system may lie in the universal point of sale information exchange engine, which may be configured to receive itemized information of electronic transactions from different sources and automatically process this information to be IRS compliant. This automated, real-time approach to transaction processing and compliance may represent an approach to handling the challenges of modern financial data management.

FIG. 1 illustrates a block diagram of an automated transaction processing system employed in an illustrative use-case scenario. The automated transaction processing system 102 shown in FIG. 1 provides a comprehensive solution for real-time data exchange and compliance. To illustrate the capabilities of the automated transaction processing system 102, consider a common problem faced by organizations: managing information flows and ensuring regulatory compliance across multiple data sources and platforms.

In some examples, in a traditional data management scenario, an individual may initiate a data exchange using a device at a terminal. The exchange details may be recorded on physical media, which must be manually submitted for processing. This process may be prone to errors, delays, and potential non-compliance with regulations.

In some examples, the automated transaction processing system 102 may address these challenges by integrating multiple components that work together to capture, process, and categorize data in real-time. A mobile device 100 may initiate a data exchange at a terminal. The POS exchange engine 104 may detect this exchange instantly and capture the itemized details.

In some examples, the POS exchange engine 104 may support multiple exchange methods including contactless (NFC, QR codes), digital wallets, distributed ledger technologies, and traditional data transfer methods. This versatility may allow the system to handle various types of exchanges across different platforms.

In some examples, the transaction database 106 may store the captured exchange data, while the compliance engine 108 processes this information according to rules stored in the compliance rules database 110. This may ensure that each exchange is automatically categorized and processed in compliance with relevant regulations.

In some examples, the data integration engine 114 may play a role in determining exchange details of the data exchange process as a function of a data processing network. In some examples, the data exchange process may be initiated by an exchange action between a first device and a second device at an exchange engine. The data integration engine 114 may collect and standardize data from various sources, including the user profile database 116 and the anomaly detection model 118.

In some examples, for organizational exchanges, the offer and adjudication engine 112 may analyze the exchange details to determine if they align with policies and allocations. This automated review process may help prevent unauthorized exchanges and ensure compliance with internal guidelines.

In some examples, the automated transaction processing system 102 may interface with external devices and platforms to provide a seamless experience. A client device 120 may be used by individuals to review and approve exchanges. The crypto server cluster 122 may enable secure processing of distributed ledger exchanges. The management platform 124 may receive standardized, compliant exchange data, eliminating the need for manual data entry and reducing the risk of errors in reporting.

In some examples, by transforming raw exchange data into standardized, compliant formats in real-time, the automated transaction processing system 102 may address the technical challenges of integrating diverse exchange methods and ensuring regulatory compliance. The system's ability to automatically process and categorize exchanges from multiple sources may represent an improvement over traditional manual methods.

A feature of system may lie in the system's universal information exchange engine, which may receive itemized information of electronic exchanges from diverse sources and automatically process this information to be compliant. This automated, real-time approach to exchange processing and compliance may provide a technical approach to the challenges of modern data management. As an illustrative example, some uses of this system may be related to ensuring tax compliance for financial transactions.

In an illustrative example, a user may utilize the automated transaction processing system 102 shown in FIG. 1 to generate tax-compliant records for their business expenses. The user may initiate a transaction using their mobile device 100, such as purchasing office supplies with a company credit card. The POS exchange engine 104 may instantly detect and capture the transaction details, including the itemized list of purchased items, the total amount, and the merchant information. This data may then be stored in the transaction database 106 and simultaneously processed by the compliance engine 108, which may apply relevant tax rules from the compliance rules database 110 to categorize the expense appropriately.

In some examples, as the user continues to make various business-related purchases throughout the day, the automated transaction processing system 102 may continuously capture and process each transaction in real-time. The data integration engine 114 may combine this transaction data with user profile information from the user profile database 116, ensuring that each expense is associated with the correct cost or project. At the end of the day, week, or month, the user can access their client device 120 to review a comprehensive, IRS-compliant report of all their business expenses, categorized and ready for tax filing or reimbursement claims. This automated process may eliminate the need for manual receipt tracking and data entry, thereby reducing the time and effort required for expense management and tax preparation.

In some examples, the system may address challenges in the field of reimbursement categorization and classification by implementing advanced machine learning algorithms. For example, the AI categorization engine 404 may analyze transaction data in real-time, leveraging the machine learning model 408 to accurately classify expenses across various categories. This approach may reduce errors and inconsistencies that often occur in manual classification processes.

In some examples, the system may employ natural language processing techniques to extract relevant information from unstructured data sources, such as receipt images or email confirmations. In some cases, the OCR image processing 510 component may work in conjunction with the AI categorization engine 404 to automatically interpret and categorize expense information from physical receipts. This integration may enable the system to process a wide range of input formats, reducing the need for manual data entry and improving the accuracy and speed of reimbursement classification. By automating these complex processes, the system may provide a more efficient and reliable solution for expense management and compliance.

Figure 2:
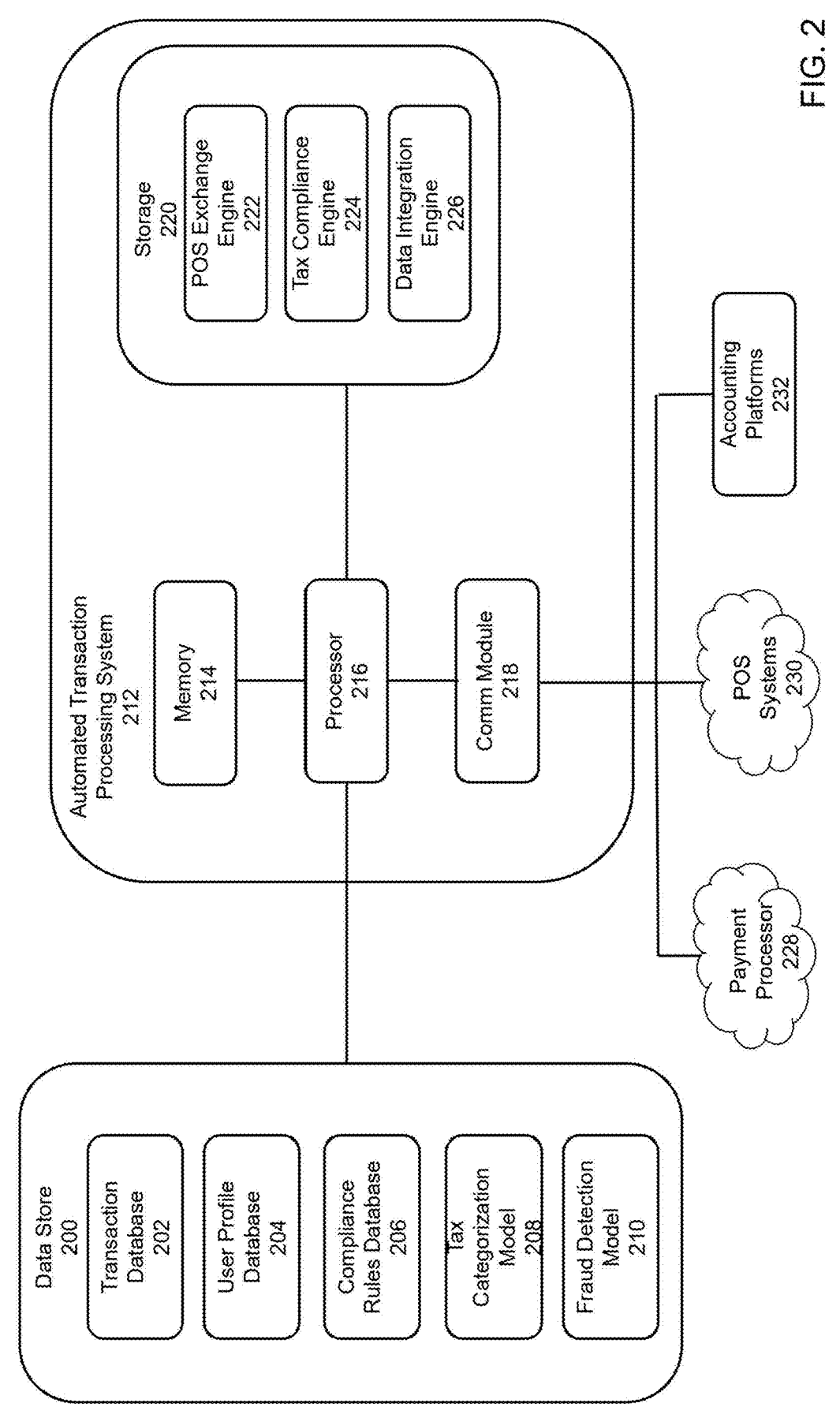
FIG. 2 illustrates another block diagram of an automated transaction processing system.

FIG. 2 illustrates another block diagram of an automated transaction processing system 212. The automated transaction processing system 212 includes a data store 200 and multiple processing components that work together to transform raw transaction data into standardized, tax-compliant formats.

In some examples, a data store 200 may serve as a central repository for various types of data used in transaction processing and compliance. As shown in FIG. 2, the data store 200 includes a transaction database 202, a user profile database 204, and a compliance rules database 206. In some examples, the transaction database 202 may store detailed information about each transaction processed by the system. The user profile database 204 may contain information about users of the system, such as their payment preferences and transaction history. The compliance rules database 206 may store rules and regulations used to ensure transactions are processed in compliance with relevant standards.

In some examples, the data store 200 includes a tax categorization model 208 and a fraud detection model 210. In some examples, the tax categorization model 208 may be used to automatically categorize transactions for tax purposes, transforming raw transaction data into structured, tax-compliant information. The fraud detection model 210 may analyze transaction patterns to identify potential fraudulent activity, which in turn adds a layer of security to the data transformation process.

In some examples, the automated transaction processing system 212 may include several components that work together to process and transform transaction data. Memory 214 and a processor 216 may form the core of the system's computational capabilities. The processor 216 may execute instructions stored in the memory 214 to perform various data transformation tasks.

In some examples, a communication module 218 may enable the automated transaction processing system 212 to interact with external systems and devices. This module may facilitate the exchange of data between the system and payment processors 228, POS systems 230, accounting platforms 232, and/or the like.

As shown in FIG. 2, storage 220 within the automated transaction processing system 212 contains several specialized engines that perform specific data transformation tasks. A POS exchange engine 222 may interface with POS systems 230 to capture and process transaction data in real-time. A tax compliance engine 224 may apply rules from the compliance rules database 206 to ensure transactions are processed in a tax-compliant manner. A data integration engine 226 may combine and standardize data from various sources, transforming it into a consistent format for further processing.

In operation, the automated transaction processing system 212 may apply a compliance data model to exchange details in order to generate a dual compliant data object. This process may involve retrieving a compliance data model from the central storage device (data store 200). The compliance data model may be based on a predetermined set of features identified from the exchange details and a type of an external data processing product, such as an accounting platform 232.

In some examples, a feature of the system may lie in its ability to automatically transform diverse transaction data into standardized, tax-compliant formats in real-time. By integrating multiple data sources, applying sophisticated models, and leveraging specialized processing engines, the automated transaction processing system 212 may provide an approach to the challenges of modern financial data management and compliance.

Figure 3:
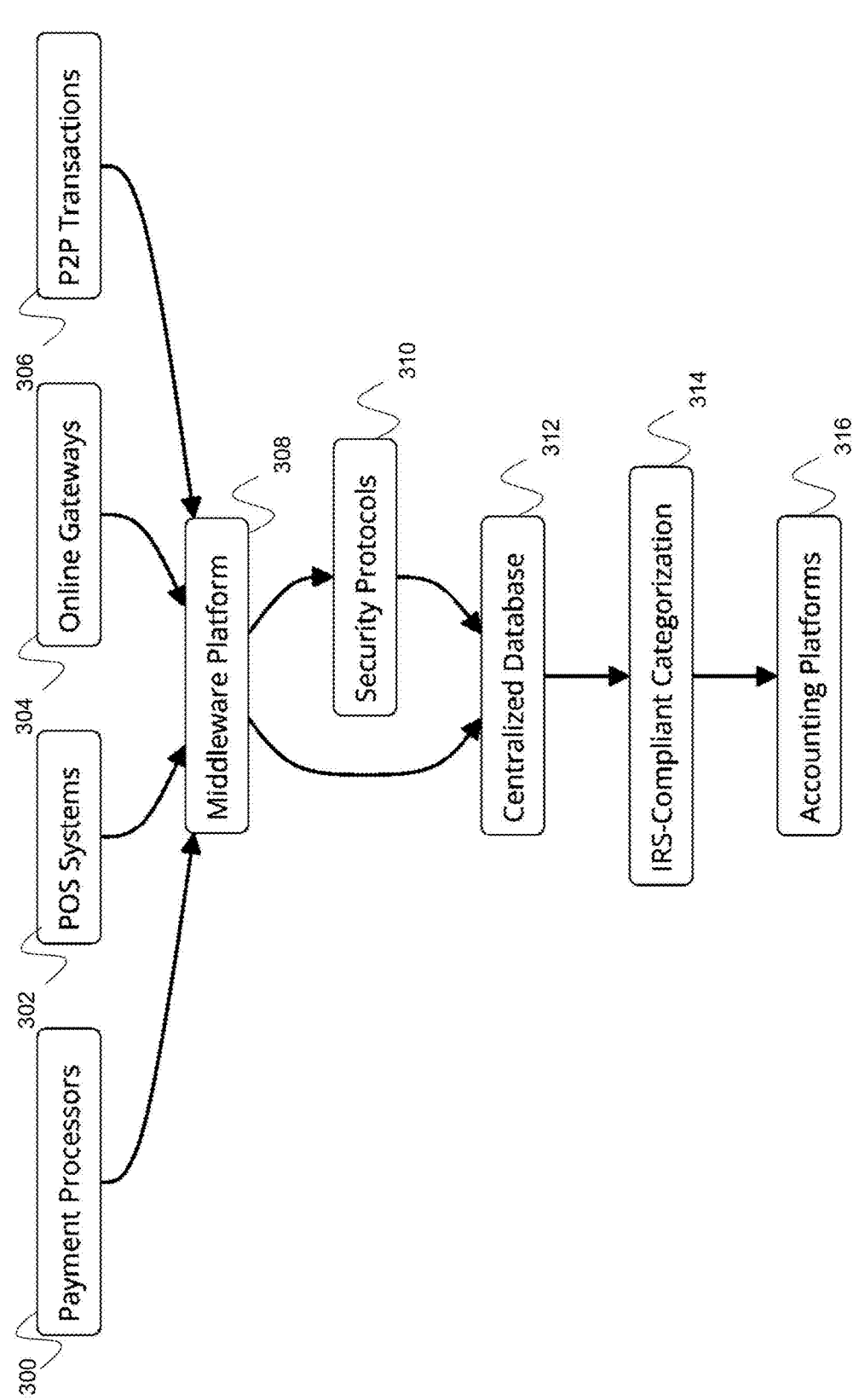
FIG. 3 illustrates a block diagram of a transaction processing system.

FIG. 3 illustrates a block diagram of a transaction processing system. As shown, the transaction processing system includes payment processors 300, POS systems 302, online gateways 304, and P2P transactions 306 that connect to a middleware platform 308. The middleware platform 308 interfaces with security protocols 310 and a centralized database 312. The centralized database 312 connects to an IRS-compliant categorization module 314, which in turn connects to accounting platforms 316.

In some examples, the payment processors 300, POS systems 302, online gateways 304, and P2P transactions 306 may represent different transaction sources that feed data into the middleware platform 308. In some examples, the payment processors 300 may include credit card networks, digital wallet providers, cryptocurrency exchanges, and/or the like. The POS systems 302 may be physical terminals in retail locations and/or virtual checkout systems for e-commerce. Online gateways 304 may facilitate transactions on websites and/or mobile applications. P2P transactions 306 may include direct transfers between individuals using mobile payment apps.

In some examples, the middleware platform 308 may serve as a central hub for processing incoming transaction data from these diverse sources. In some examples, the middleware platform 308 may standardize the format of incoming data, thereby ensuring that transactions from different sources are transformed into a consistent structure for further processing. This data transformation step may enable uniform analysis and categorization across various transaction types.

In some examples, the middleware platform 308 may implement security protocols 310 to protect the transaction data during processing. In some examples, these security protocols 310 may include encryption methods, access controls, data anonymization techniques, and/or the like. By applying these security measures, the middleware platform 308 may transform raw transaction data into a secure format, thereby reducing the risk of unauthorized access or data breaches.

In some examples, the centralized database 312 may store the standardized and secured transaction data. In some examples, the centralized database 312 may organize the data into structured tables, allowing for efficient querying and analysis. This organization may transform the raw transaction data into a format optimized for rapid retrieval and processing.

In some examples, the IRS-compliant categorization module 314 may process the stored transaction data to ensure it meets tax reporting requirements. In some examples, this module may apply predefined rules and algorithms to categorize each transaction according to IRS guidelines. This categorization process may transform the standardized transaction data into tax-compliant information, associating each transaction with appropriate tax categories and codes.

In some examples, the dual compliant data object generated by the IRS-compliant categorization module 314 may include an association between the data exchange process and a characterization. In some examples, this association may link a specific transaction to its relevant tax category, such as "business expense" or "capital expenditure." This transformation may add a layer of tax-related metadata to the transaction data.

In some examples, the compliant input generated by the IRS-compliant categorization module 314 may be configured for generating compliant data of the data exchange process as a function of the association. In some examples, this may involve structuring the transaction data in a format that can be directly imported into tax preparation software. This transformation step may ensure that the processed transaction data is ready for use in tax-related applications.

In some examples, the dual compliant data object may include a compliant input of the external data processing product, which in this case may be the accounting platforms 316. In some examples, this compliant input may be formatted according to the specific requirements of different accounting software systems, thereby ensuring compatibility of integration.

In some examples, the accounting platforms 316 may receive the processed and categorized transaction data from the IRS-compliant categorization module 314. In some examples, these platforms may use the transformed data to automatically update financial records, generate reports, and/or prepare tax filings.

In some examples, by transforming transaction data through multiple stages—from initial capture, through standardization, security enhancement, tax categorization, and finally to accounting system integration—the transaction processing system illustrated in FIG. 3 may provide a comprehensive approach for managing diverse financial transactions in a tax-compliant manner.

Figure 4:
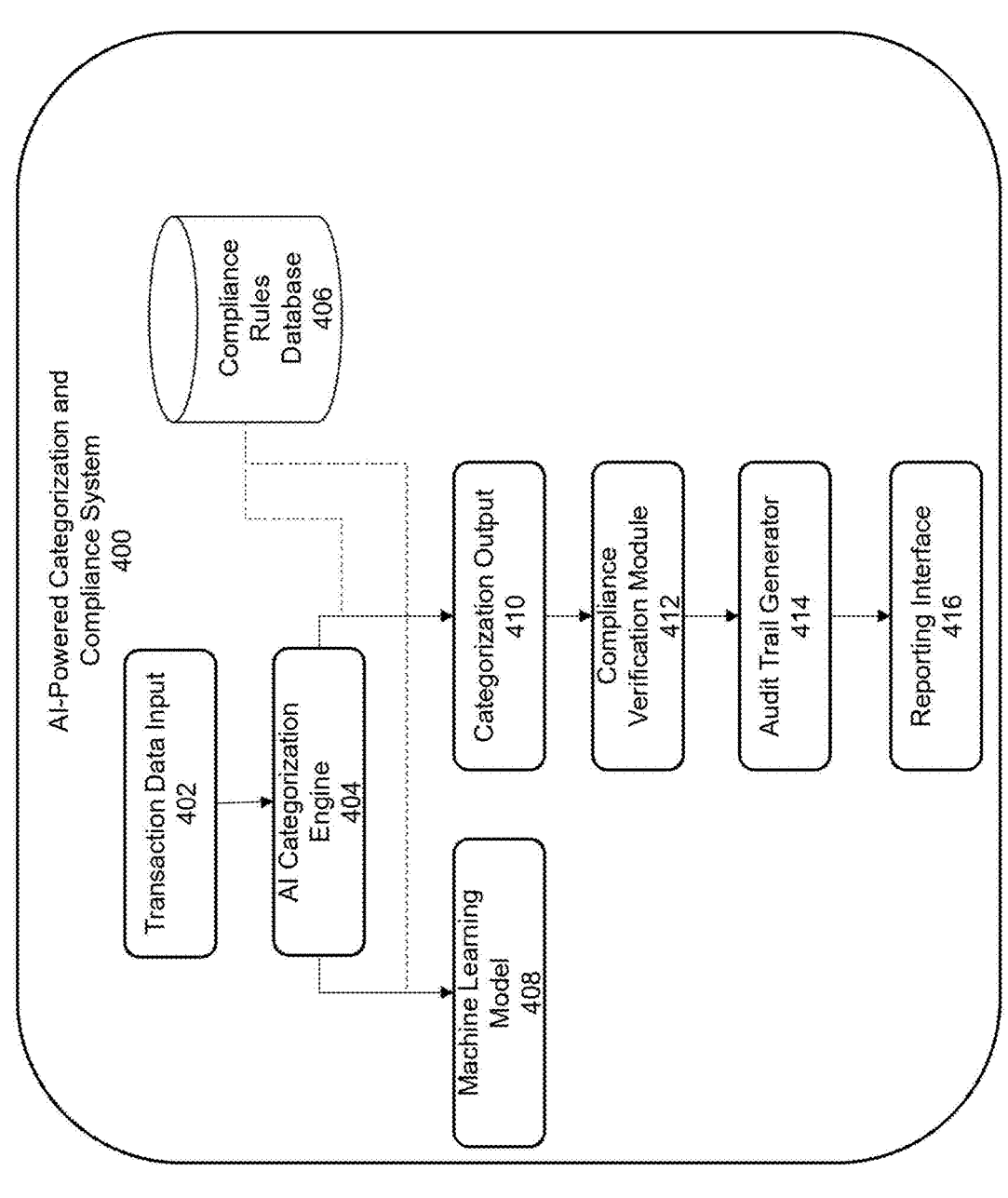
FIG. 4 illustrates a block diagram of an AI-powered categorization and compliance system.

FIG. 4 illustrates a block diagram of an AI-powered categorization and compliance system 400. As shown, the AI-powered categorization compliance system 400 includes a transaction data input 402 that receives transaction information. The transaction data input 402 connects to an AI categorization engine 404, which processes the incoming transaction data.

In some examples, the AI categorization engine 404 may interact with a compliance rules database 406 that contains categorization and compliance parameters. In some examples, the compliance rules database 406 may include regulatory rules for various jurisdictions. These regulatory rules may be used to ensure that transactions are categorized and processed in accordance with relevant standards.

In some examples, the AI categorization engine 404 may connect to a machine learning model 408 that assists in the categorization process. In some examples, the machine learning model 408 may be trained on historical transaction data to recognize patterns and improve categorization accuracy over time. This continuous learning process may allow the AI-powered categorization compliance system 400 to adapt to new types of transactions and evolving regulatory requirements.

In some examples, the AI categorization engine 404 may generate output that flows to a categorization output 410. In some examples, the categorization output 410 may include detailed information about each transaction, such as the assigned category, relevant tax codes, and any flags for potential compliance issues.

In some examples, the categorization output 410 may connect to a compliance verification module 412 that verifies the categorized data meets compliance requirements. In some examples, the compliance verification module 412 may apply additional checks to ensure that the categorized transactions align with specific regulatory requirements. This module may be configured to automatically flag data exchange processes when applying the compliance data model to the exchange details generates an abnormal result. For instance, if a transaction is categorized in a way that conflicts with established regulatory rules, the compliance verification module 412 may flag this for further review.

In some examples, the compliance verification module 412 may connect to an audit trail generator 414 that creates records of the categorization and compliance verification processes. In some examples, the audit trail generator 414 may produce logs of how each transaction was processed, categorized, and verified. These logs may include timestamps, applied rules, and any manual interventions, thereby providing a comprehensive record for auditing purposes.

In some examples, the audit trail generator 414 may connect to a reporting interface 416 that presents the processed information. In some examples, the reporting interface 416 may generate customized reports for different stakeholders, such as financial managers, compliance officers, or auditors. These reports may include summaries of transaction categories, compliance status, and any flagged issues requiring attention.

In some examples, the AI-powered categorization compliance system 400 may transform raw transaction data through multiple stages. Initially, the transaction data input 402 may receive unstructured or semi-structured transaction information. This data may come from various sources, such as the POS exchange engine or the centralized database.

The AI categorization engine 404, working in combination with the machine learning model 408 and the compliance rules database 406, may transform this raw data into structured, categorized information. This transformation may involve applying complex algorithms to analyze transaction details, assign appropriate categories, and ensure compliance with regulatory rules.

In some examples, the categorization output 410 may represent a transformation of the original data, with each transaction now enriched with metadata such as category assignments and compliance indicators. The compliance verification module 412 may further transform this data by applying additional checks and potentially flagging transactions that require further attention.

In some examples, the audit trail generator 414 may transform the processed transaction data into a detailed log of all operations performed on the data. This transformation may create a data structure that captures the history of each transaction's processing, which may in turn be valuable auditing.

In some examples, the reporting interface 416 may transform the processed data into visual representations and structured reports. This stage of transformation may convert complex transaction data into understandable formats for various stakeholders.

Throughout this process, the AI-powered categorization compliance system 400 may incorporate AI-powered fraud detection mechanisms. In some examples, these mechanisms may be integrated into the AI categorization engine 404 and the compliance verification module 412. By analyzing patterns in transaction data and comparing them against known fraud indicators, the system may flag suspicious activities.

The AI-powered categorization compliance system 400 may provide an approach for automating the complex tasks of transaction categorization and compliance verification. By leveraging artificial intelligence and machine learning, the system can handle large volumes of diverse transaction data, adapt to changing regulations, and provide consistent, accurate categorization and compliance checks.

Figure 5:
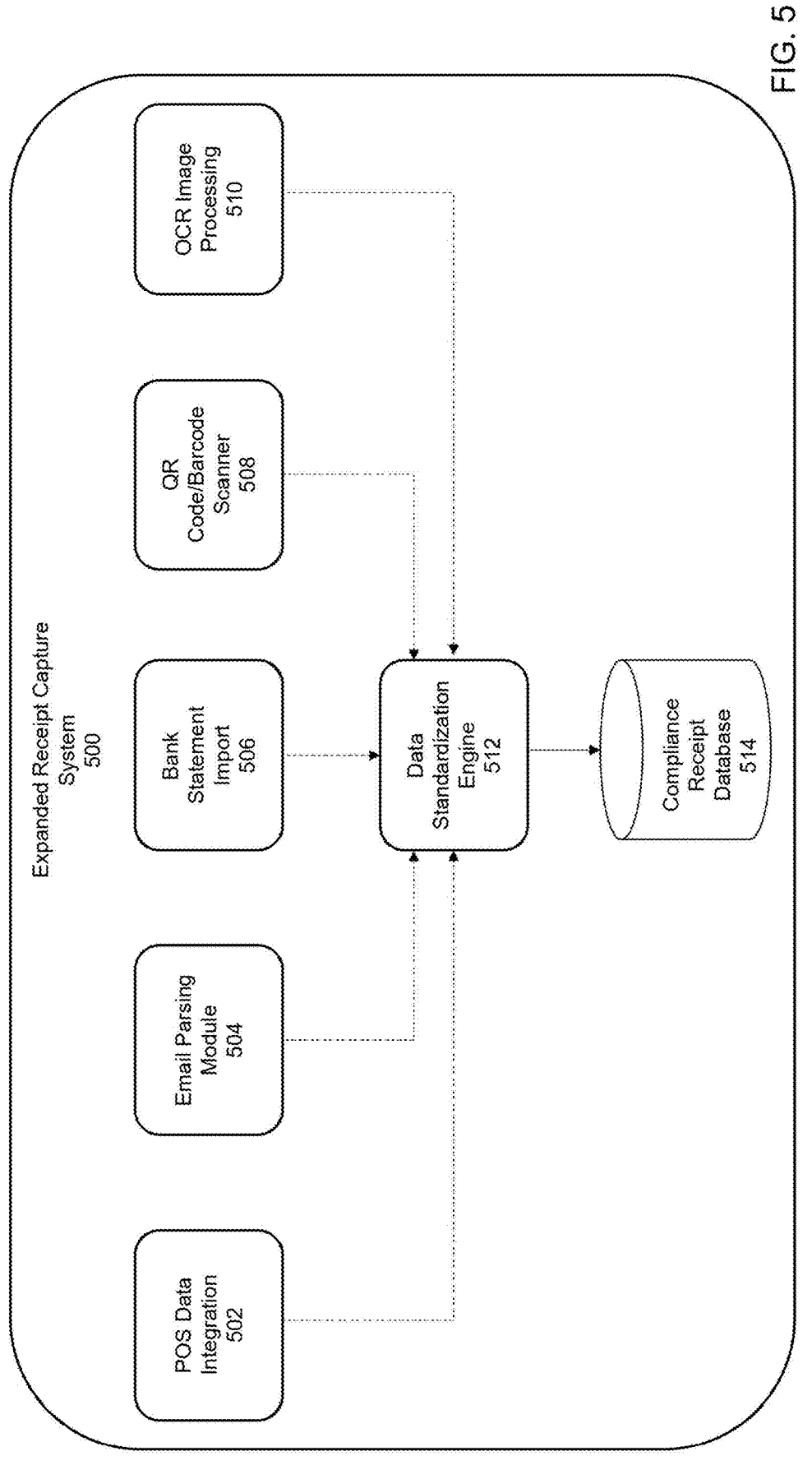
FIG. 5 illustrates a block diagram of an expanded receipt capture system.

FIG. 5 illustrates a block diagram of an expanded receipt capture system 500. As shown, the expanded receipt capture system 500 includes multiple modules for capturing and processing transaction data from different sources.

In some examples, a POS data integration 502 may receive transaction data directly from point-of-sale systems. In some examples, the POS data integration 502 may interface with the POS exchange engine to capture real-time transaction details at the point of sale. This direct integration may transform raw transaction data into a structured format suitable for further processing.

In some embodiments, an email parsing module 504 may process transaction information received through email communications. In some examples, the email parsing module 504 may extract relevant transaction details from email receipts, transforming unstructured email content into structured transaction data.

In some embodiments, a bank statement import 506 may enable the import of transaction data from bank statements. In some examples, the bank statement import 506 may transform financial institution records into a standardized format compatible with the expanded receipt capture system 500.

In some embodiments, a QR code/barcode scanner 508 may process transaction information encoded in QR codes and barcodes. In some examples, the QR code/barcode scanner 508 may transform visual codes into digital transaction data, which in turn may enable quick and accurate capture of transaction details.

In some examples, an OCR image processing 510 may convert images of physical receipts into digital transaction data. In some examples, the OCR image processing 510 may transform printed receipt information into machine-readable text, thereby allowing for the digitization of paper receipts.

In some embodiments, the various inputs feed into a data standardization engine 512, which processes and standardizes the transaction data from the different sources into a consistent format. In some examples, the data standardization engine 512 may apply rules from the compliance rules database to ensure that all captured data meets regulatory requirements. This transformation step may create a uniform data structure regardless of the original input method.

In some examples, the standardized transaction data may then be stored in a compliance receipt database 514. In some examples, the compliance receipt database 514 may organize the standardized data in a way that facilitates retrieval and analysis for tax compliance purposes.

The expanded receipt capture system 500 may transform diverse types of transaction data into a standardized, compliant format. This transformation process may involve the following steps. The process may involve data capture, in which the system captures data from various sources, including POS systems, emails, bank statements, QR codes, and physical receipts. Each input method may transform raw data into a digital format. The process may involve data extraction, in which for inputs like emails and images, the system may extract relevant transaction details, transforming unstructured or semi-structured data into structured information. The process may involve data standardization, in which the data standardization engine 512 may apply consistent rules and formats to all incoming data, thereby transforming diverse inputs into a uniform structure. The process may involve compliance verification, in which the system may apply rules from the compliance rules database to ensure that the standardized data meets regulatory requirements, thereby transforming raw transaction data into compliant information. The process may involve data storage, in which the transformed and verified data may be stored in the compliance receipt database 514, organizing it for efficient retrieval and analysis.

In some examples, the expanded receipt capture system 500 may associate the exchange action with profile information related to the device and environmental information of the exchange action. For instance, when capturing data from a mobile device 100 making a purchase, the system may associate the transaction with the user's profile stored in the user profile database and contextual information such as location or time of purchase.

In some examples, the compliance data model used by the expanded receipt capture system 500 may associate the data with profile information of the device and environmental information. In some examples, this may involve linking transaction data not only to the purchaser's profile but also to information about the point of sale, as well as relevant contextual data.

In some examples, the compliant data generated by the expanded receipt capture system 500 may include public rules compliant data. In some examples, this may involve structuring the captured and standardized transaction data in accordance with publicly available tax regulations or financial reporting standards.

By integrating multiple data capture methods and applying standardization and compliance checks, the expanded receipt capture system 500 may provide a comprehensive approach for transforming diverse transaction data into a uniform, compliant format suitable for further processing and analysis.

Figure 6:
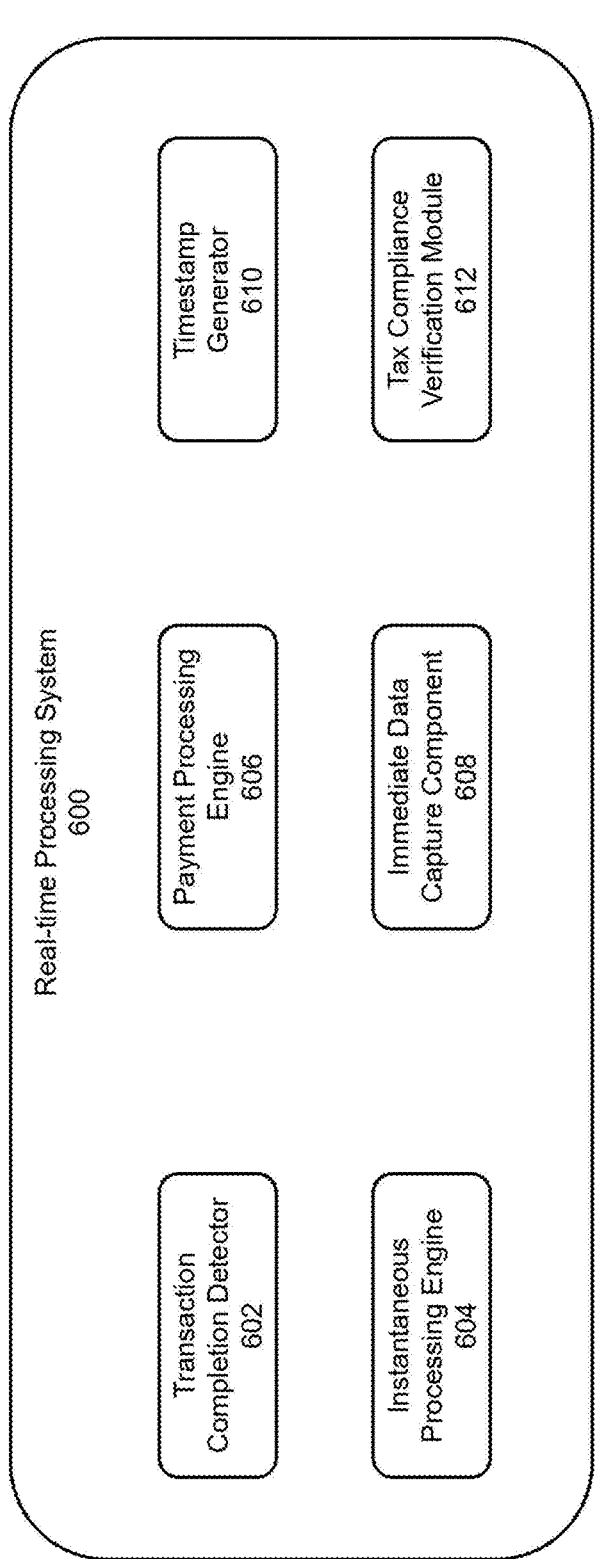
FIG. 6 illustrates a block diagram of a real-time processing system.

FIG. 6 illustrates a block diagram of a real-time processing system 600. As shown, the real time processing system 600 includes a transaction completion detector 602, an instantaneous processing engine 604, a payment processing engine 606, an immediate data capture component 608, a timestamp generator 610, and a tax compliance verification module 612.

In some examples, the real time processing system 600 may be implemented as part of the automated transaction processing system 102 to enable instantaneous detection, processing, and verification of transactions. In some examples, the real time processing system 600 may be executed by at least one processor, such as the processor 216, to perform operations for transforming transaction data in real-time.

In some examples, a transaction completion detector 602 may monitor and detect when transactions are completed. In some examples, the transaction completion detector 602 may interface with the POS exchange engine 104 to receive signals indicating the completion of a transaction. This detection may trigger the subsequent real-time processing steps.

In some examples, an instantaneous processing engine 604 may process transaction data as it is received. In some examples, the instantaneous processing engine 604 may transform raw transaction data into a standardized format suitable for further analysis and categorization. This transformation may occur within milliseconds of the transaction completion, thereby ensuring that the data is processed in real-time.

In some examples, a payment processing engine 606 may handle the processing of payment information associated with transactions. In some examples, the payment processing engine 606 may interface with various payment processors 300 to process payments across different currencies. This capability may enable the real time processing system 600 to support multi-currency transactions and global tax compliance.

In some examples, an immediate data capture component 608 may capture transaction data in real-time. In some examples, the immediate data capture component 608 may interface with the POS systems 302 or online gateways 304 to extract detailed transaction information. This component may transform raw transaction data into structured data objects that can be further processed by the system.

In some examples, a timestamp generator 610 may generate timestamps associated with the transactions. In some examples, the timestamp generator 610 may add timing information to each transaction record, which may be useful for audit trails and compliance verification.

In some examples, a tax compliance verification module 612 may verify that transaction data meets tax compliance requirements. In some examples, the tax compliance verification module 612 may apply rules from the compliance rules database 110 to transform transaction data into tax-compliant formats. This module may perform checks to ensure transactions adhere to relevant tax regulations.

In some examples, the real time processing system 600 may receive tamper-proof signals of the data exchange process through a wide area communication network. In some examples, these signals may be encrypted and transmitted using secure protocols to ensure the integrity of the transaction data. The system may use the security protocols 310 to verify and process these tamper-proof signals, transforming them into trusted transaction records.

By integrating these components, the real time processing system 600 may transform raw transaction data into processed and tax-compliant information in real-time. This transformation may occur through the following steps: detection, where the transaction completion detector 602 transforms signals from payment systems into transaction initiation events; data capture, where the immediate data capture component 608 transforms raw transaction data into structured data objects; processing, where the instantaneous processing engine 604 and payment processing engine 606 transform the structured data objects into standardized transaction records; timestamping, where the timestamp generator 610 adds timing information to the processed records; and compliance verification, where the tax compliance verification module 612 transforms the processed records into tax-compliant data structures.

This multi-stage transformation process may enable the real time processing system 600 to handle diverse transaction types, support global operations, and ensure compliance with various tax regulations, all in real-time. The system's ability to process and transform data instantaneously may represent an advancement over traditional batch processing methods.

Figure 7:
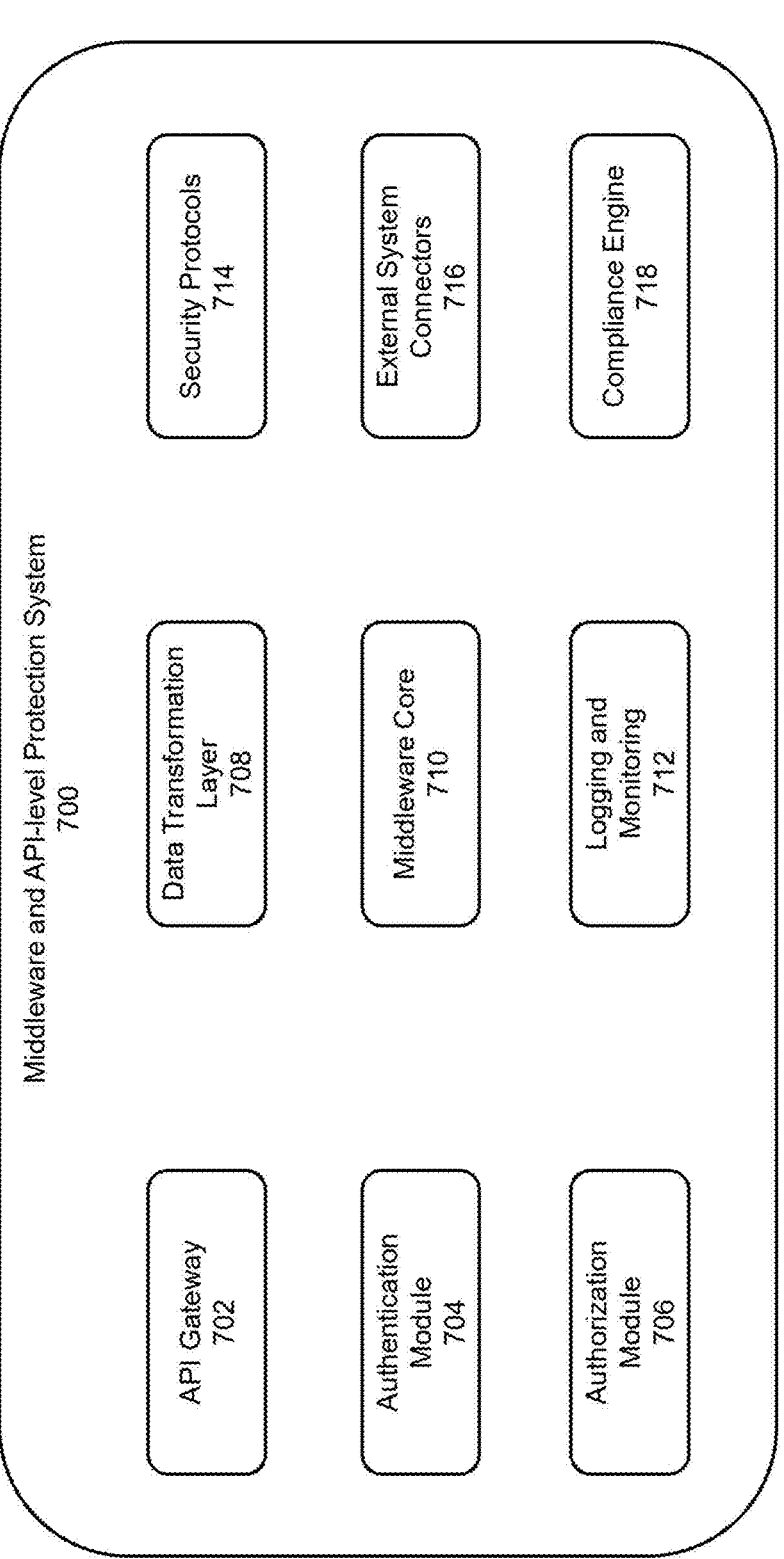
FIG. 7 illustrates a block diagram of a middleware and API-level protection system.

FIG. 7 illustrates a block diagram of a middleware and API-level protection system 700. As shown, the middleware and API-level protection system 700 includes an API gateway 702 that serves as an entry point for external communications. The system includes an authentication module 704 for verifying user identities and an authorization module 706 for managing access permissions.

As shown, the middleware and API-level protection system 700 includes a data transformation layer 708 that processes and converts data between different formats. In some examples, the data transformation layer 708 may transform raw transaction data from various sources into a standardized format suitable for further processing. This transformation may involve normalizing data fields, converting currency values, or restructuring data hierarchies to ensure consistency across different input sources.

In some examples, a middleware core 710 may provide central processing and coordination functionality. In some examples, the middleware core 710 may orchestrate the flow of data between different components of the system, ensuring that transaction information is properly routed and processed. The middleware core 710 may transform incoming requests into appropriate internal formats and coordinate the application of various security and compliance checks.

As shown, the system includes a logging and monitoring component 712 that tracks system activities and performance. In some examples, the logging and monitoring component 712 may transform raw system events and metrics into structured log entries and performance indicators. This transformation may allow for analysis of system behavior and facilitates the detection of potential security threats.

In some examples, the middleware and API-level protection system 700 may incorporate security protocols 714 for protecting data and communications. In some examples, the security protocols 714 may transform plain text data into encrypted formats, thereby ensuring that sensitive transaction information remains secure during transmission. The security protocols 714 may also generate and verify digital signatures, thereby transforming transaction data into tamper-evident formats.

In some examples, external system connectors 716 may enable integration with outside platforms. In some examples, the external system connectors 716 may transform data formats between the middleware system and external systems, ensuring compatibility and seamless data exchange. This transformation may involve mapping data fields, converting protocols, or adapting authentication mechanisms to match the requirements of different external platforms.

In some examples, a compliance engine 718 may ensure adherence to regulatory requirements. In some examples, the compliance engine 718 may transform transaction data to meet specific regulatory rules stored in the compliance rules database. This transformation may involve categorizing transactions, applying tax rules, and/or generating compliance reports in required formats.

In some examples, the middleware and API-level protection system 700 may allow for categorization adjustments with transparent logs for accountability. In some examples, the compliance engine 718 may provide functionality for users to modify transaction categorizations. When such adjustments are made, the logging and monitoring component 712 may transform these actions into audit logs, creating a record of all changes.

In some examples, the computer program product that implements the middleware and API-level protection system 700 may include a program of instructions embodied on a computer readable medium. In some examples, this computer readable medium may be the memory 214 or the storage 220 of the automated transaction processing system 212. The program of instructions, when executed by the processor 216, may cause the middleware and API-level protection system 700 to perform its various data transformation and operations.

In some examples, the compliance data model used by the compliance engine 718 may include regulatory rules. In some examples, these regulatory rules may be stored in the compliance rules database 206. The compliance engine 718 may transform transaction data based on these rules, thereby ensuring that the processed data meets relevant regulatory requirements across different jurisdictions.

By integrating multiple layers of security, data transformation, and compliance checks, the middleware and API-level protection system 700 may provide a comprehensive approach for securely processing and transforming transaction data. The system's ability to adapt to various data formats, apply security measures, and ensure regulatory compliance may represent an advancement in transaction processing and data protection.

Figure 8:
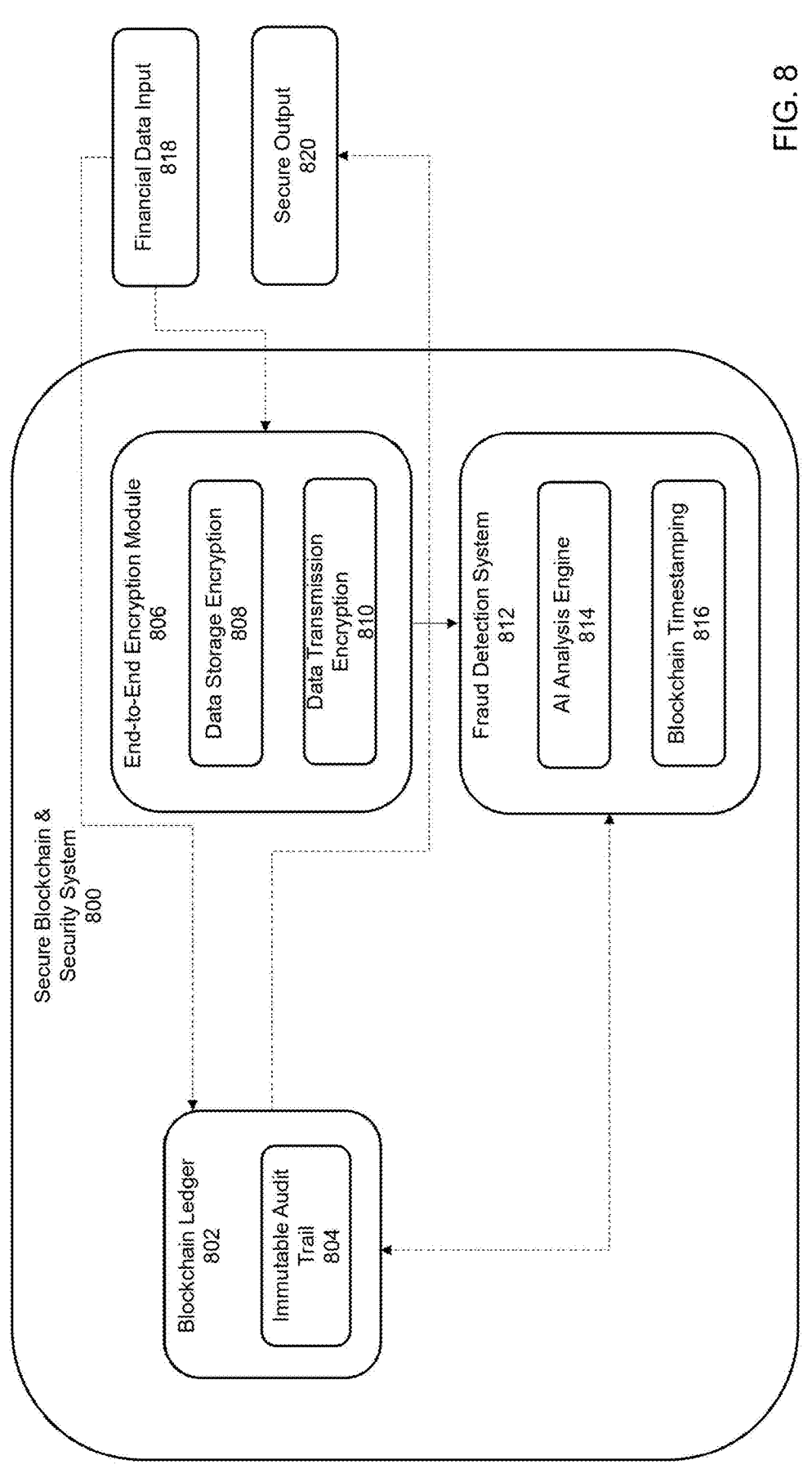
FIG. 8 illustrates a block diagram of a secure blockchain and security system.

FIG. 8 illustrates a block diagram of a secure blockchain and security system 800. As shown, the secure blockchain and security system 800 includes a blockchain ledger 802 that contains an immutable audit trail 804 for recording transaction data.

In some examples, the blockchain ledger 802 may be used by the middleware platform to create tamper-proof transaction logs. In some examples, the blockchain ledger 802 may record each transaction processed by the automated transaction processing system 102 as a block in the blockchain. This may transform individual transaction records into a linked chain of cryptographically secured blocks, thereby creating an immutable audit trail 804 that cannot be altered without detection.

In some examples, the secure blockchain and security system 800 may include an end-to-end encryption module 806 that provides encryption capabilities through data storage encryption 808 and data transmission encryption 810 components. The data storage encryption 808 may transform stored transaction information into encrypted data that can only be accessed with proper authorization. The data transmission encryption 810 may transform transaction data into encrypted formats during transfer between components of the automated transaction processing system 102 or external systems.

In some examples, a fraud detection system 812 may be incorporated into the secure blockchain and security system 800. The fraud detection system 812 may contain an AI analysis engine 814 for analyzing transaction patterns and a blockchain timestamping 816 component for recording verified transaction timing information. In some examples, the AI analysis engine 814 may transform large volumes of transaction data into risk scores or fraud indicators by applying machine learning algorithms to detect anomalous patterns.

In some examples, the blockchain timestamping 816 component may transform transaction timestamps into cryptographically secured records on the blockchain ledger 802. This process may create a timeline of transactions that can be used for audit purposes or to detect potential manipulation.

In some examples, the secure blockchain and security system 800 may receive financial data input 818 and may process it through its various security and encryption components to produce secure output 820. In some examples, the financial data input 818 may include transaction details from the POS exchange engine 104 or other sources. The system may transform this input data through multiple stages of encryption, blockchain recording, and fraud analysis to produce secure output 820.

In some examples, the secure blockchain and security system 800 may support integration with cryptocurrency payment systems using blockchain for secure data retrieval. In some examples, when processing transactions from the crypto server cluster 122, the system may use the blockchain ledger 802 to verify and record cryptocurrency transactions. This process may transform cryptocurrency transaction data into standardized records that can be integrated with other financial data in the automated transaction processing system 102.

In some examples, the system may include customizable thresholds for flagged expenses. In some examples, the fraud detection system 812 may transform transaction data and user profiles from the user profile database 116 into risk assessments based on predefined thresholds. Transactions that exceed these thresholds may be transformed into flagged items that trigger specific approval workflows, thereby adding an additional layer of security to the transaction processing system.

By integrating blockchain technology, advanced encryption, and AI-powered fraud detection, the secure blockchain and security system 800 may transform raw financial data into highly secure transaction records. This multi-layered approach to data transformation and security may represent an advancement in protecting financial transactions.

Figure 9:
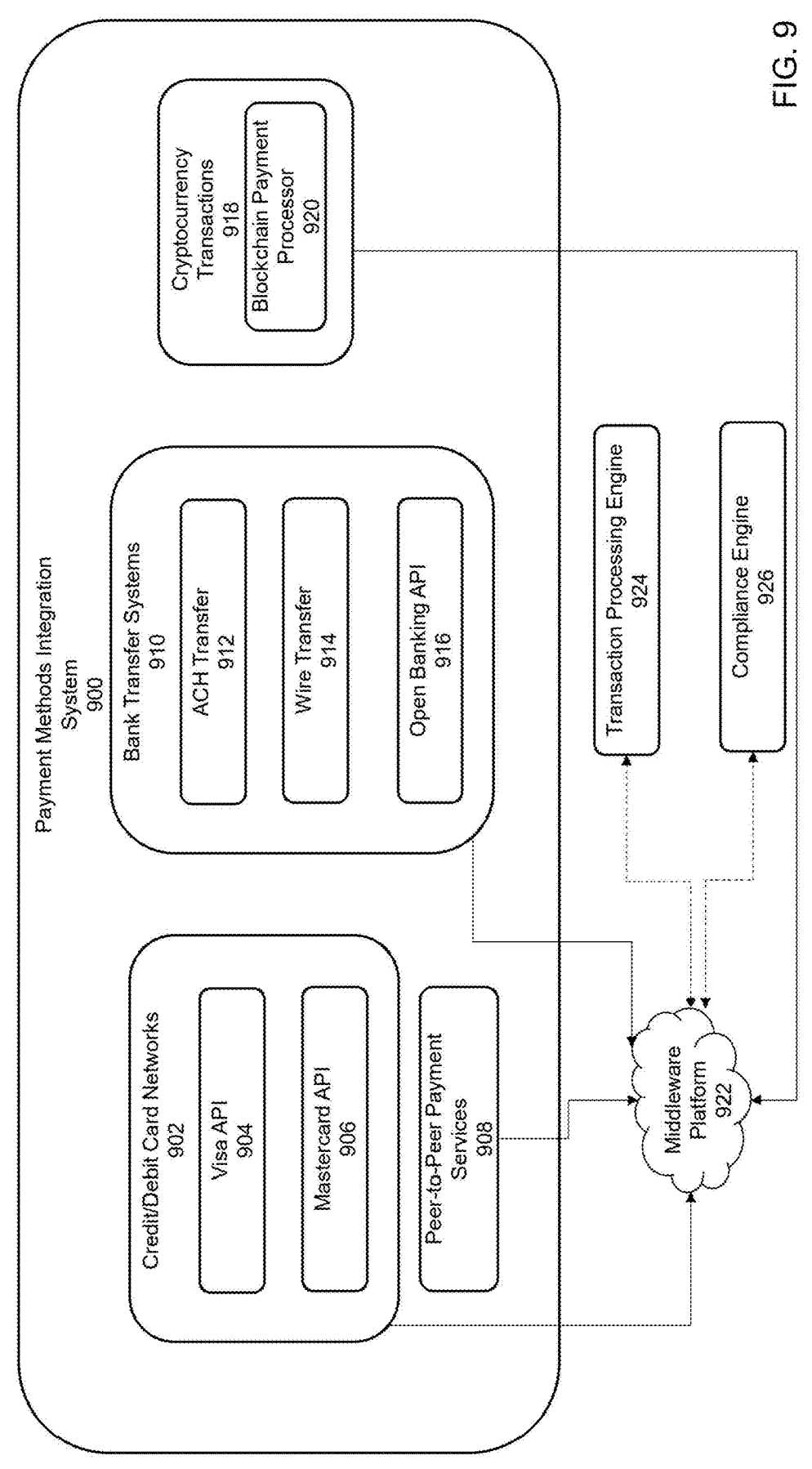
FIG. 9 illustrates a block diagram of a payment methods integration system.

FIG. 9 illustrates a block diagram of a payment methods integration system 900. As shown, the payment methods integration system 900 includes credit/debit card networks 902, bank transfer systems 910, and cryptocurrency transactions 918.

In some examples, the credit/debit card networks 902 may include a Visa API 904 and a Mastercard API 906. A peer-to-peer payment services component 908 may be connected to the credit/debit card networks 902. In some examples, the peer-to-peer payment services component 908 may transform transaction data from services like Venmo or PayPal into a standardized format compatible with the middleware platform 922.

In some examples, the bank transfer systems 910 may include an ACH transfer component 912, a wire transfer component 914, and an open banking API 916. In some examples, the ACH transfer component 912 may transform ACH transaction data into a format suitable for processing by the middleware platform 922. The wire transfer component 914 may transform wire transfer data, which often contains different metadata compared to other payment types, into a standardized structure.

In some examples, the cryptocurrency transactions 918 may include a blockchain payment processor 920. In some examples, the blockchain payment processor 920 may transform cryptocurrency transaction data from various blockchain networks into a format compatible with traditional financial systems, thereby enabling integration with other payment methods.

In some examples, a middleware platform 922 may interface with the credit/debit card networks 902, bank transfer systems 910, and cryptocurrency transactions 918. The middleware platform 922 may transform diverse payment data into a unified format for further processing. In some examples, the middleware platform 922 may standardize transaction fields, convert currencies, and normalize metadata across different payment methods.

In some examples, the middleware platform 922 may connect to a transaction processing engine 924 and a compliance engine 926. The transaction processing engine 924 may transform the standardized payment data into structured transaction records. In some examples, the transaction processing engine 924 may extract relevant details such as merchant information, transaction date, amount, and purpose from the payment data.

In some examples, the compliance engine 926 may transform the structured transaction records into IRS-compliant data. In some examples, the compliance engine 926 may apply rules from the compliance rules database to categorize transactions and generate appropriate tax codes. The compliance engine 926 may auto-fill IRS-compliant notes for transactions, transforming raw transaction data into tax-ready information.

In some examples, the payment methods integration system 900 may capture merchant details, date, amount, and purpose of transactions across various payment methods. In some examples, the middleware platform 922 may extract this information from different APIs and data structures, transforming it into a consistent format for storage in the transaction database.

In some examples, the system may prompt users to add context for flagged transactions. In some examples, the compliance engine 926 may identify transactions that require additional information for tax compliance. The system may transform these flagged transactions into user prompts, displayed on a client device, requesting additional context from the user.

By integrating diverse payment methods and transforming transaction data into standardized formats, the payment methods integration system 900 may enable comprehensive financial data management across multiple platforms and payment types. The system's ability to transform varied payment data into unified, tax-compliant information may represent an advancement in automated transaction processing and compliance.

Figure 10:
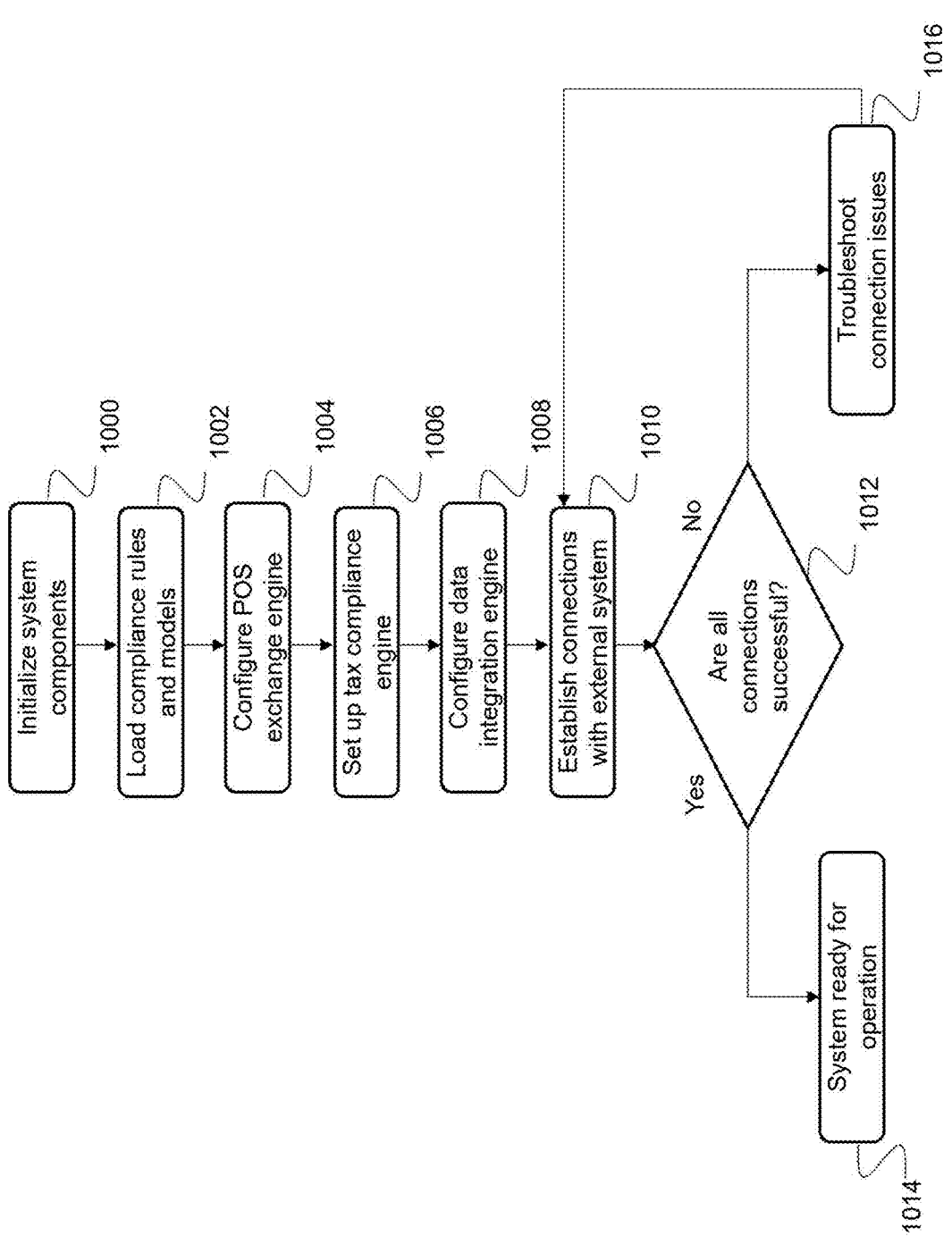
FIG. 10 illustrates a flowchart for configuring a system for transaction processing and compliance.

FIG. 10 illustrates a flowchart for configuring a system for transaction processing and compliance. The flowchart begins with a step 1000, which involves initializing system components. In some examples, this initialization may transform the automated transaction processing system 102 from an inactive state to an active state, preparing the various modules and engines for operation.

At step 1002, compliance rules and models may be loaded. In some examples, this step may involve transforming static rule sets and model parameters stored in the compliance rules database 110 into active, in-memory data structures that can be quickly accessed and applied during transaction processing.

At step 1004, the POS exchange engine 104 may be configured. In some examples, this configuration process may transform the POS exchange engine 104 from a generic state to a customized state optimized for specific types of point-of-sale systems and transaction formats.

At step 1006, the compliance engine 108 may be set up. In some examples, this setup process may transform the compliance engine 108 by loading relevant tax regulations and configuring algorithms to ensure accurate categorization and processing of transactions for tax purposes.

At step 1008, the data integration engine 114 may be configured. In some examples, this configuration may transform the data integration engine 114 by establishing connections with various data sources and defining data transformation rules to ensure consistent formatting across different input types.

At step 1010, the system may establish connections with external systems. In some examples, this step may transform the automated transaction processing system 102 from an isolated state to a connected state, thereby enabling data exchange with external entities such as the accounting platforms 316 and the crypto server cluster 122.

At step 1012, the system may check if all connections are successful. This step may transform binary connection status data into a single boolean value representing overall system readiness.

If the connections are successful, the process moves to a step 1014, where the system is ready for operation. This step may transform the entire automated transaction processing system 102 from a configuration state to an operational state.

If the connections are not successful, the process moves to a step 1016, where connection issues are troubleshooted. In some examples, this troubleshooting process may transform error logs and connection status data into actionable diagnostics, which in turn may guide system administrators in resolving connectivity issues.

Throughout this configuration process, the automated transaction processing system 102 may undergo the following transformations: data structure transformation, where static configuration files and database entries are transformed into dynamic, in-memory data structures optimized for real-time processing; functional transformation, where generic system components are transformed into specialized modules tailored for specific transaction processing and compliance tasks; connectivity transformation, where the system transforms from an isolated state to a connected state, enabling data exchange with external platforms; and state transformation, where the overall system state is transformed from inactive, through various configuration stages, to a fully operational state ready for transaction processing.

By systematically transforming the system through these configuration steps, the automated transaction processing system 102 may be prepared to handle diverse transaction types, apply relevant compliance rules, and integrate with external platforms for comprehensive financial data management.

FIG. 11 illustrates a flowchart for a data exchange process with compliance integration. At step 1100, a real-time data exchange process may be detected using an exchange engine. In some examples, the exchange engine may be the POS exchange engine 222, which may transform signals from payment systems into transaction initiation events.

At step 1102, exchange details may be determined through a data processing network. In some examples, the data processing network may include components such as the payment processors 300, POS systems 302, and online gateways 304. The data processing network may transform raw transaction data into structured information containing details such as transaction amount, merchant information, and payment method.

At step 1104, a compliance data model may be retrieved from a central storage device. In some examples, the central storage device may be the data store 200, and the compliance data model may be stored in the compliance rules database 206. This step may transform static rule sets and model parameters into active, in-memory data structures that can be quickly accessed and applied during transaction processing.

At step 1106, the compliance data model may be applied to the exchange details using a processor. In some examples, the processor may be the processor 216 of the automated transaction processing system 212. This step may transform the structured transaction data by applying compliance rules, categorizing the transaction, and generating appropriate tax codes.

At step 1108, a dual compliant data object may be generated using the processor. In some examples, the dual compliant data object may be a data structure that meets both financial reporting standards and tax compliance requirements. This step may transform the processed transaction data into a standardized format that can be used across different financial systems.

At step 1110, an integrated receipt may be generated with the dual compliant data object using the processor. In some examples, this step may transform the dual compliant data object into a human-readable format that includes all necessary transaction details and compliance information.

At step 1112, the data exchange process may be associated with a characterization using the processor. In some examples, this characterization may involve categorizing the transaction for accounting or tax purposes. This step may transform the transaction data by adding metadata that describes the nature and purpose of the transaction.

At step 1114, compliant input may be provided to an external data processing product using the processor. In some examples, the external data processing product may be one of the accounting platforms 316. This step may transform the dual compliant data object into a format compatible with external financial management systems.

Throughout this process, the system may transform raw transaction data through the following stages: detection transformation, where signals from payment systems are transformed into transaction events; data structuring transformation, where raw transaction details are transformed into structured data objects; compliance model application transformation, where structured data is transformed by applying compliance rules and categorizations; dual compliance transformation, where processed data is transformed into a format that meets multiple compliance standards simultaneously; receipt generation transformation, where compliant data is transformed into a human-readable receipt format; characterization transformation, where transaction data is transformed by adding metadata; and external system compatibility transformation, where compliant data is transformed into formats compatible with external financial systems.

By performing these transformations in real-time, the system may enable immediate compliance integration with various financial processes. This real-time processing and transformation may represent an advancement over traditional batch processing methods, allowing for instant availability of compliant financial data across multiple systems and platforms.

Figure 12:
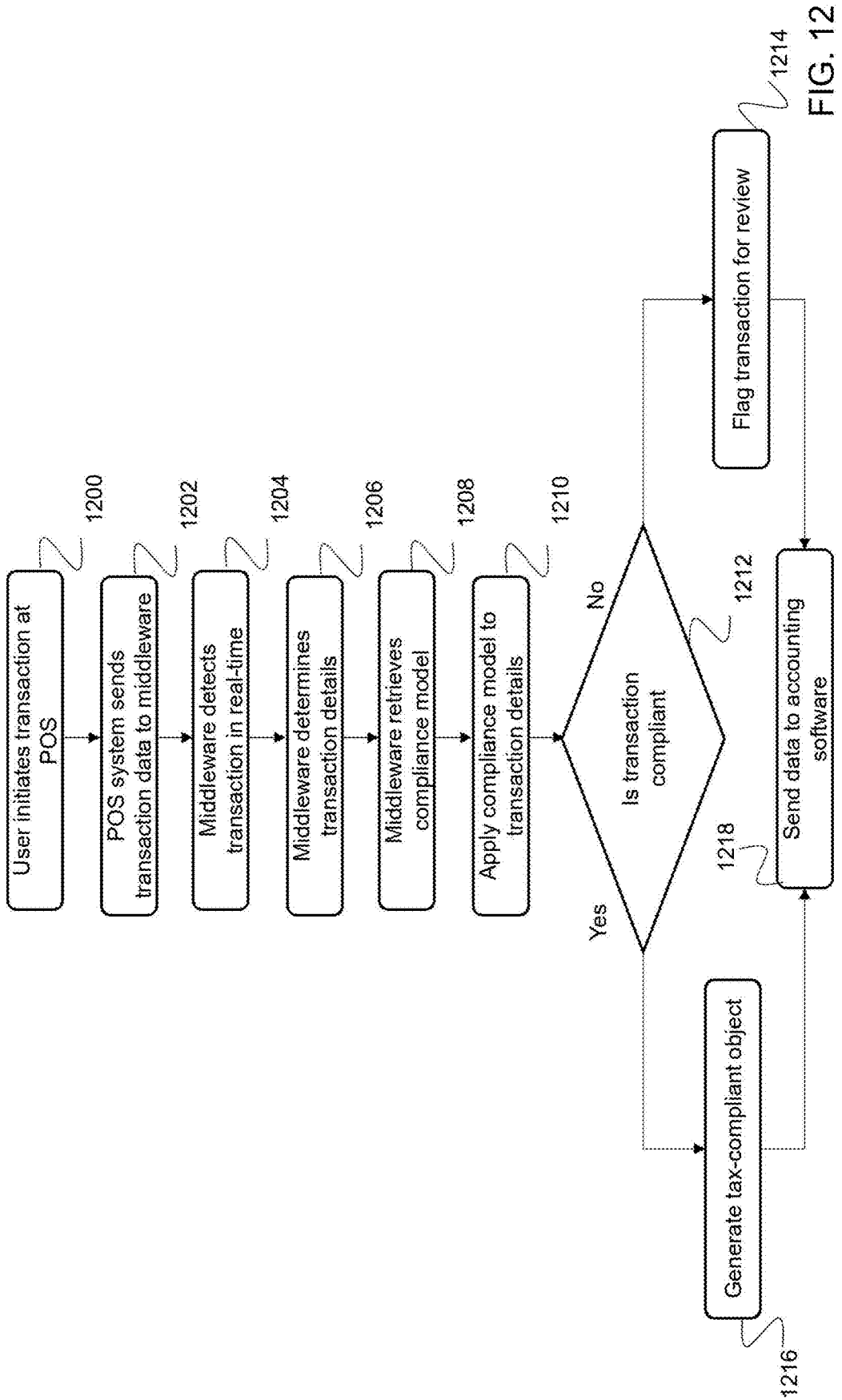
FIG. 12 illustrates a flowchart for a transaction processing and compliance system.

FIG. 12 illustrates a flowchart for a transaction processing and compliance system. The workflow begins with a step 1200, where a user initiates a transaction at a point of sale (POS). In some examples, this transaction initiation may transform a user's intent to purchase into an electronic signal captured by the POS systems 230.

At step 1202, the POS system may send transaction data to the middleware platform 308. This step may transform raw transaction data into a standardized format suitable for processing by the middleware platform 308. The standardized format may include details such as transaction amount, merchant information, and timestamp.

At step 1204, the middleware platform 308 may detect the transaction in real-time. In some examples, this detection may transform incoming data streams into discrete transaction events that can be processed individually.

At step 1206, the middleware platform 308 may determine transaction details. This step may involve transforming the standardized transaction data into a more detailed structure by enriching it with additional information from various sources. For example, the middleware platform 308 may associate the transaction with user profile information from the user profile database 204 or merchant details from the transaction database 202.

At step 1208, the middleware platform 308 may retrieve a compliance model. In some examples, this step may transform static compliance rules stored in the compliance rules database 206 into an active, in-memory model that can be applied to the transaction data.

At step 1210, the compliance model may be applied to the transaction details. This step may transform the enriched transaction data by categorizing it according to tax rules, assigning appropriate compliance codes, and generating compliance-related metadata.

At step 1212, it may be evaluated whether the transaction is compliant. This evaluation may transform the processed transaction data into a binary compliance status. If the transaction is compliant, the process moves to a step 1216 to generate a tax-compliant object. If the transaction is not compliant, the process proceeds to a step 1214 to flag the transaction for review.

At step 1214, non-compliant transactions may be flagged for review. It may transform the transaction data by adding metadata indicating the specific compliance issues that need to be addressed. This flagged data may be sent to the compliance verification module 412 for manual review.

At step 1216, a tax-compliant object may be generated. This step may transform the processed transaction data into a structured object that meets specific tax reporting requirements. The tax-compliant object may include categorized transaction details, relevant tax codes, and any additional context required for accurate tax reporting.

From both step 1214 and step 1216, the process converges at a step 1218, where the data may be sent to accounting software. This step may transform the tax-compliant object or flagged transaction data into a format compatible with external accounting platforms 316. The transformation may involve mapping data fields, adjusting data structures, or generating specific report formats required by the accounting software.

Throughout this workflow, the transaction data may undergo the following transformations: initial capture transformation, where user actions are transformed into electronic transaction signals; standardization transformation, where raw transaction data is transformed into a consistent format for processing; event detection transformation, where continuous data streams are transformed into discrete transaction events; enrichment transformation, where basic transaction data is transformed by adding contextual information from various sources; compliance model application transformation, where transaction data is transformed through the application of compliance rules and categorizations; compliance status transformation, where processed data is transformed into a binary compliance status; tax object generation transformation, where compliant transaction data is transformed into structured, tax-ready objects; and accounting software integration transformation, where tax-compliant objects are transformed into formats compatible with external accounting systems.

By performing these transformations in real-time, the automated transaction processing system 102 may enable immediate compliance verification and integration with accounting processes. This real-time processing and multistage transformation may represent an advancement over traditional batch processing methods, allowing for instant availability of compliant financial data across multiple systems and platforms.

The automated transaction processing system may be adapted for use in various industries beyond traditional financial transactions. In some examples, the system may be applied to healthcare billing and insurance claims processing. The system may transform medical procedure codes and patient data into standardized billing information.

In some examples, the system may be extended to handle supply chain management and logistics. The system may transform shipping and inventory data into standardized transaction records.

The data transformation capabilities of the system may be enhanced to handle more complex data types. In some examples, the system may process and transform unstructured data such as images or audio recordings of transactions. The system may use advanced machine learning algorithms to extract relevant transaction details from these unstructured sources and transform them into standardized, compliant data objects.

The compliance engine of the system may be expanded to handle a wider range of regulatory frameworks. In some examples, the system may be configured to transform transaction data to meet compliance requirements for multiple jurisdictions simultaneously.

The blockchain integration of the system may be extended to support smart contracts. In some examples, the system may transform traditional contract terms into executable code on a blockchain, automatically triggering compliant transactions when predefined conditions are met.

The AI-powered categorization and fraud detection components of the system may be enhanced with more advanced machine learning techniques. In some examples, the system may use deep learning models to transform complex transaction patterns into highly accurate risk scores and compliance predictions.

The user interface of the system may be adapted for augmented reality (AR) applications. In some examples, the system may transform transaction data into AR visualizations, allowing users to interact with financial information in a three-dimensional space while maintaining compliance with data protection regulations.

The system's encryption and security protocols may be enhanced to incorporate quantum-resistant algorithms. In some examples, the system may transform sensitive financial data using post-quantum cryptography techniques, ensuring long-term data security in the face of advancing quantum computing capabilities.

In some embodiments, the automated transaction processing system may provide a middleware platform that integrates with payment networks, point-of-sales (POS) systems, online payment gateways, and other transaction platforms to process, categorize, and deliver financial transactions in real time for tax-ready reporting and compliance with regulatory requirements.

The system may address challenges related to managing transaction receipts for businesses and individuals. In some aspects, the system may eliminate the need for manual processes such as keeping physical receipts, photographing them, or manually entering data into accounting systems. This may reduce errors, delays, and administrative overhead associated with traditional methods.

In some implementations, the system may capture itemized receipt data, categorize expenses, and integrate the information directly into accounting systems while addressing regulatory requirements, such as detailed expense purposes and categories.

The middleware platform may be configured to perform one or more of the following: automatically detect transactions in real time; capture itemized details, which may include merchant information, transaction amount, purpose, and tax-relevant metadata; enable regulatory-compliant categorization (e.g., "Travel," "Meals") based on predefined or user-configured rules; allow optional purchaser involvement for adding context to flagged transactions, such as client names or project purposes; and deliver tax-ready data to accounting systems immediately or after user review.

In some embodiments, the middleware platform may operate across various payment methods, which may include credit cards, digital wallets, ACH transfers, and cryptocurrency. The system may also support different transaction types, such as person-to-business (P2B), business-to-business (B2B), and person-to-person (P2P) transactions.

The automated transaction processing system may include the following features: real-time detection, where the system may automatically detect transactions via integration with payment processors and networks; itemized receipt capture, where the system may capture and process receipts in real time, using application programming interfaces (APIs), optical character recognition (OCR), and other technologies; regulatory-compliant categorization, where the system may automate categorization with the ability for manual input on flagged expenses (e.g., meals, travel); seamless accounting integration, where the system may synchronize with various accounting platforms, ensuring tax-ready records; multi-payment compatibility, where the system may support card-present, card-not-present, and cryptocurrency transactions; security, where the system may ensure secure data transmission with encryption and tokenization.

In some implementations, the system architecture may include the following: middleware platform, where this component may integrate with payment networks, POS systems, online gateways, and accounting software (e.g., it may capture transaction metadata and itemized details using APIs and machine learning techniques); centralized database, where this component may standardize and store transaction data for categorization and reporting purposes; security protocols, where the system may comply with various regulations such as PCI DSS, GDPR, and CCPA to protect data integrity.

The transaction flow through the system may include the following: in-store purchases (POS), where The middleware may capture data from POS systems in real time; online purchases (Payment Gateways), where the middleware may extract data from online payment gateways and associated invoices; peer-to-peer payments (P2P), where the system may add contextual metadata, such as reimbursement or shared expense details; recurring payments, where the system may automate categorization for subscriptions or recurring expenses; flagged expenses, where the system may send prompts to users for additional details (e.g., client names, project purposes) for flagged transactions.

In some aspects, the system may include features for regulatory compliance, such as the following: capturing merchant details, date, amount, and purpose of transactions; auto-filling regulatory-compliant notes for common transactions (e.g., "Office Supplies"); prompting users to add necessary context for flagged transactions.

The automated transaction processing system may be applicable to various use cases, including the following: Business-to-Business (B2B) (e.g., a company purchasing equipment online may have itemized details captured and synced with accounting software for accurate tax categorization); Person-to-Business (P2B) (e.g., an employee's travel expenses may be automatically categorized and synced with the employer's accounting system; Person-to-Person (P2P) (e.g., a reimbursed expense may be flagged for additional context, ensuring regulatory compliance).

In some implementations, the system may include customizable thresholds and approval workflows for flagged expenses. The system may transform transaction data and user profiles into risk assessments based on predefined or customized thresholds. Transactions that exceed these thresholds may be transformed into flagged items that trigger specific approval workflows, potentially adding an additional layer of security and compliance to the transaction processing system.

The automated transaction processing system may provide the following: reduction or elimination of manual receipt tracking; enhanced compliance with tax regulations; simplified workflows through automated data capture and categorization; and seamless integration with existing accounting platforms.

In some embodiments, the system may support integration with cryptocurrency payment systems using blockchain technology for secure data retrieval. When processing transactions from cryptocurrency sources, the system may use a blockchain ledger to verify and record cryptocurrency transactions. This process may transform cryptocurrency transaction data into standardized, secure records that can be integrated with other financial data in the automated transaction processing system.

The system may be designed to capture merchant details, date, amount, and purpose of transactions across various payment methods. In some implementations, the middleware platform may extract this information from different APIs and data structures, transforming it into a consistent format for storage in the transaction database.

In certain aspects, the system may prompt users to add necessary context for flagged transactions. The compliance engine may identify transactions that require additional information for tax compliance. The system may transform these flagged transactions into user prompts, displayed on a client device, requesting additional context from the user.

By integrating diverse payment methods and transforming transaction data into standardized, compliant formats, the automated transaction processing system may enable comprehensive financial data management across multiple platforms and payment types. The system's ability to transform varied payment data into unified, tax-compliant information may represent an advancement in automated transaction processing and compliance.

Although various embodiments have been described with reference to the figures, other embodiments are possible.

Although an exemplary system has been described with reference to FIGS. 1-12, other implementations may be deployed in other industrial, scientific, medical, commercial, and/or residential applications.

In various embodiments, some bypass circuits implementations may be controlled in response to signals from analog or digital components, which may be discrete, integrated, or a combination of each. Some embodiments may include programmed, programmable devices, or some combination thereof (e.g., PLAs, PLDs, ASICs, microcontroller, microprocessor), and may include one or more data stores (e.g., cell, register, block, page) that provide single or multi-level digital data storage capability, and may be volatile, nonvolatile, or some combination thereof. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Although an example of a system, which may be portable, has been described with reference to the above figures, other implementations may be deployed in other processing applications, such as desktop and networked environments.

Temporary auxiliary energy inputs may be received, for example, from chargeable or single use batteries, which may enable use in portable or remote applications. Some embodiments may operate with other DC voltage sources, such as (nominal) batteries, for example. Alternating current (AC) inputs, which may be provided, for example from a 50/60 Hz power port, or from a portable electric generator, may be received via a rectifier and appropriate scaling. Provision for AC (e.g., sine wave, square wave, triangular wave) inputs may include a line frequency transformer to provide voltage step-up, voltage step-down, and/or isolation.

Although particular features of an architecture have been described, other features may be incorporated to improve performance. For example, caching (e.g., L1, L2, . . . ) techniques may be used. Random access memory may be included, for example, to provide scratch pad memory and or to load executable code or parameter information stored for use during runtime operations. Other hardware and software may be provided to perform operations, such as network or other communications using one or more protocols, wireless (e.g., infrared) communications, stored operational energy and power supplies (e.g., batteries), switching and/or linear power supply circuits, software maintenance (e.g., self-test, upgrades), and the like. One or more communication interfaces may be provided in support of data storage and related operations.

Some systems may be implemented as a computer system that can be used with various implementations. For example, various implementations may include digital circuitry, analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memory for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and CD-ROM and DVD-ROM disks. The processor and the memory can be supplemented by, or incorporated in, ASICs (application-specific integrated circuits).

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. Various embodiments may be implemented in a computer system that includes a graphical user interface and/or an Internet browser. To provide interaction with a user, some implementations may be implemented on a computer having a display device. The display device may, for example, include an LED (light-emitting diode) display. In some implementations, a display device may, for example, include a CRT (cathode ray tube). In some implementations, a display device may include, for example, an LCD (liquid crystal display). A display device (e.g., monitor) may, for example, be used for displaying information to the user. Some implementations may, for example, include a keyboard and/or pointing device (e.g., mouse, trackpad, trackball, joystick), such as by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, the computers and networks forming the Internet, or some combination thereof. Other implementations may transport messages by broadcasting all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, multiplexing techniques based on frequency, time, or code division, or some combination thereof. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits, other modules, or some combination thereof. In various examples, the modules may include analog logic, digital logic, discrete components, traces and/or memory circuits fabricated on a silicon substrate including various integrated circuits (e.g., FPGAs, ASICs), or some combination thereof. In some embodiments, the module(s) may involve execution of preprogrammed instructions, software executed by a processor, or some combination thereof. For example, various modules may involve both hardware and software.

In an illustrative example, a system may include a data store with a program of instructions and a processor operably coupled to the data store. When the processor executes the program of instructions, it may perform operations to automatically generate an integrated receipt at a data exchange process. These operations may include one or more of the following. The operations may include detecting the data exchange process in real-time. The data exchange process may be initiated by an exchange action between a first device and a second device at an exchange engine. The operations may include determining exchange details of the data exchange process as a function of a data processing network of the data exchange process. The operations may include retrieving a compliance data model from a central storage device. This model may be based on a predetermined set of features identified from the exchange details and a type of an external data processing product. The operations may include applying the compliance data model to the exchange details to generate a dual compliant data object that includes the integrated receipt of the data exchange process. The dual compliant data object may include one or more of the following: an association between the data exchange process and a characterization; and/or a compliant input of the external data processing product configured for generating compliant data of the data exchange process as a function of the association.

For example, the compliance data model may include regulatory rules and may be configured to automatically flag the data exchange process when applying the compliance data model to the exchange details generates an abnormal result. For example, the compliant data may include public rules compliant data. For example, determining the exchange details of the data exchange process may include associating the exchange action with profile information related to the first device and environmental information of the exchange action. For example, the compliance data model may associate the data with profile information of the first device and the second device, and environmental information. For example, the operations may further include receiving tamper-proof signals of the data exchange process through a wide area communication network.

In an illustrative example, a computer-implemented method performed by at least one processor to automatically generate an integrated receipt at a data exchange process may include one or more of the following. The method may include detecting the data exchange process in real-time. The method may include determining exchange details of the data exchange process as a function of a data processing network of the data exchange process. The method may include retrieving a compliance data model from a central storage device. This model may be based on a predetermined set of features identified from the exchange details and a type of an external data processing product. The method may include applying the compliance data model to the exchange details to generate a dual compliant data object that includes the integrated receipt of the data exchange process. The dual compliant data object may include one or more of the following: an association between the data exchange process; and/or a compliant input of the external data processing product configured for generating compliant data of the data exchange process as a function of the association.

For example, the compliance data model may include regulatory rules and may be configured to automatically flag the data exchange process when applying the compliance data model to the exchange details generates an abnormal result. For example, the data exchange process may be initiated by an exchange action between a first device and a second device at an exchange engine. For example, the compliant data may include public rules compliant data. For example, determining the exchange details of the data exchange process may include associating the exchange action with profile information related to the first device and environmental information of the exchange action. For example, the compliance data model may associate the data with profile information of the first device and the second device, and environmental information. For example, the operations may further include receiving tamper-proof signals of the data exchange process through a wide area communication network.

In an illustrative example, a computer program product may include a program of instructions tangibly embodied on a computer readable medium. When the instructions are executed on a processor, the processor may perform operations to automatically generate an integrated receipt at a data exchange process. These operations may include one or more of the following. The operations may include detecting the data exchange process in real-time. The operations may include determining exchange details of the data exchange process as a function of a data processing network of the data exchange process. The operations may include retrieving a compliance data model from a central storage device. This model may be based on a predetermined set of features identified from the exchange details and a type of an external data processing product. The operations may include applying the compliance data model to the exchange details to generate a dual compliant data object that includes the integrated receipt of the data exchange process. The dual compliant data object may include one or more of the following: an association between the data exchange process and a characterization; and/or a compliant input of the external data processing product configured for generating compliant data of the data exchange process as a function of the association.

For example, the compliance data model may include regulatory rules and may be configured to automatically flag the data exchange process when applying the compliance data model to the exchange details generates an abnormal result. For example, the data exchange process may be initiated by an exchange action between a first device and a second device at an exchange engine. For example, the compliant data may include public rules compliant data. For example, determining the exchange details of the data exchange process may include associating the exchange action with profile information related to the first device and environmental information of the exchange action. For example, the compliance data model may associate the data with profile information of the first device and the second device, and environmental information. For example, the operations may further include receiving tamper-proof signals of the data exchange process through a wide area communication network.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A system comprising:

a data store comprising a program of instructions; and, a processor operably coupled to the data store such that, when the processor executes the program of instructions, the processor causes operations to be performed to automatically generate an integrated receipt at a data exchange process, the operations comprising:

detect, in path at an exchange engine and prior to completion of authorization, the data exchange process in real-time, wherein the data exchange process is initiated by an exchange action between a first device and a second device;

determine exchange details of the data exchange process as a function of a data processing network of the data exchange process;

categorize, using an AI categorization engine trained on historical transaction data to recognize patterns and improve categorization accuracy over time, the exchange details;

associate, using the AI categorization engine, the exchange details with transaction information;

verify, using a verification module, that the transaction information meets compliance requirements;

retrieve, from a central storage device, a compliance data model based on a predetermined set of features identified from the exchange details and a type of an external data processing product; and, in a single pass, apply the compliance data model to the exchange details to generate a dual compliant data object comprises the integrated receipt of the data exchange process, wherein the dual compliant data object comprises:

an association between the data exchange process and a characterization; and, a compliant input of the external data processing product configured for generating compliant data of the data exchange process as a function of the association;

bind the integrated receipt to a transaction identifier of the data exchange process by incorporating a tamper-proof signal emitted by the exchange engine;

transform, using an audit trail generator, the processed transaction data into an action log.

2. The system of claim 1, wherein the compliance data model comprises regulatory rules, and is configured to automatically flag the data exchange process when applying the compliance data model to the exchange details generates an abnormal result.

3. The system of claim 1, wherein the compliant data comprises public rules compliant data.

4. The system of claim 1, wherein determine the exchange details of the data exchange process comprises associating the exchange action with profile information related to the first device and environmental information of the exchange action.

5. The system of claim 1, wherein the compliance data model associates the data with profile information of the first device and the second device, and environmental information.

6. The system of claim 1, wherein the operations further comprise receive tamper-proof signals of the data exchange process through a wide area communication network.

7. A computer-implemented method performed by at least one processor to automatically generate an integrated receipt at a data exchange process, the method comprising:

detect, in path at an exchange engine and prior to completion of authorization, the data exchange process in real-time, wherein the data exchange process is initiated by an exchange action between a first device and a second device;

determine exchange details of the data exchange process as a function of a data processing network of the data exchange process;

categorize, using an AI categorization engine trained on historical transaction data to recognize patterns and improve categorization accuracy over time, the exchange details;

associate, using the AI categorization engine, the exchange details with transaction information;

retrieve, from a central storage device, a compliance data model based on a predetermined set of features identified from the exchange details and a type of an external data processing product; and, in a single pass, apply the compliance data model to the exchange details to generate a dual compliant data object comprises the integrated receipt of the data exchange process, wherein the dual compliant data object comprises:

an association between the data exchange process; and, a compliant input of the external data processing product configured for generating compliant data of the data exchange process as a function of the association;

bind the integrated receipt to a transaction identifier of the data exchange process by incorporating a tamper-proof signal emitted by the exchange engine;

transform, using an audit trail generator, the processed transaction data into an action log.

8. The computer-implemented method of claim 7, wherein the compliance data model comprises regulatory rules, and is configured to automatically flag the data exchange process when applying the compliance data model to the exchange details generates an abnormal result.

9. The computer-implemented method of claim 7, wherein the data exchange process is initiated by an exchange action between a first device and a second device at an exchange engine.

10. The computer-implemented method of claim 9, wherein the compliant data comprises public rules compliant data.

11. The computer-implemented method of claim 9, wherein determine the exchange details of the data exchange process comprises associating the exchange action with profile information related to the first device and environmental information of the exchange action.

12. The computer-implemented method of claim 9, wherein the compliance data model associates the data with profile information of the first device and the second device, and environmental information.

13. The computer-implemented method of claim 9, wherein the method further comprises receive tamper-proof signals of the data exchange process through a wide area communication network.

14. A computer program product comprising:

a program of instructions tangibly embodied on a computer readable medium wherein when the instructions are executed on a processor, the processor causes operations to be performed to automatically generate an integrate receipt at a data exchange process, the operations comprising:

detect, in path at an exchange engine and prior to completion of authorization, the data exchange process in real-time, wherein the data exchange process is initiated by an exchange action between a first device and a second device;

determine exchange details of the data exchange process as a function of a data processing network of the data exchange process;

categorize, using an AI categorization engine trained on historical transaction data to recognize patterns and improve categorization accuracy over time, the exchange details;

associate, using the AI categorization engine, the exchange details with transaction information;

verify, using a verification module, that the transaction information meets compliance requirements;

retrieve, from a central storage device, a compliance data model based on a predetermined set of features identified from the exchange details and a type of an external data processing product; and, in a single pass, apply the compliance data model to the exchange details to generate a dual compliant data object comprises the integrated receipt of the data exchange process, wherein the dual compliant data object comprises:

an association between the data exchange process and a characterization; and, a compliant input of the external data processing product configured for generating compliant data of the data exchange process as a function of the association;

bind the integrated receipt to a transaction identifier of the data exchange process by incorporating a tamper-proof signal emitted by the exchange engine;

transform, using an audit trail generator, the processed transaction data into an action log.

15. The computer program product of claim 14, wherein the compliance data model comprises regulatory rules, and is configured to automatically flag the data exchange process when applying the compliance data model to the exchange details generates an abnormal result.

16. The computer program product of claim 14, wherein the data exchange process is initiated by an exchange action between a first device and a second device at an exchange engine.

17. The computer program product of claim 16, wherein the compliant data comprises public rules compliant data.

18. The computer program product of claim 16, wherein determine the exchange details of the data exchange process comprises associating the exchange action with profile information related to the first device and environmental information of the exchange action.

19. The computer program product of claim 16, wherein the compliance data model associates the data with profile information of the first device and the second device, and environmental information.

20. The computer program product of claim 16, wherein the operations further comprise receive tamper-proof signals of the data exchange process through a wide area communication network.

\*    \*    \*    \*    \*